United States Patent
Lyske et al.

(10) Patent No.: US 11,080,601 B2
(45) Date of Patent: Aug. 3, 2021

(54) METHOD OF TRAINING A NEURAL NETWORK TO REFLECT EMOTIONAL PERCEPTION AND RELATED SYSTEM AND METHOD FOR CATEGORIZING AND FINDING ASSOCIATED CONTENT

(71) Applicant: MASHTRAXX LIMITED, Warwickshire (GB)

(72) Inventors: Joseph Michael William Lyske, Greater London (GB); Nadine Kroher, Seville (ES); Angelos Pikrakis, Kessariani (GR)

(73) Assignee: MASHTRAXX LIMITED

( * ) Notice: Subject to any disclaimer, the term of this patent is extended or adjusted under 35 U.S.C. 154(b) by 0 days.

(21) Appl. No.: 16/784,136

(22) Filed: Feb. 6, 2020

(65) Prior Publication Data
US 2020/0320388 A1    Oct. 8, 2020

(30) Foreign Application Priority Data

Apr. 3, 2019 (GB) .................................. 1904713
Apr. 3, 2019 (GB) .................................. 1904716
Apr. 3, 2019 (GB) .................................. 1904719

(51) Int. Cl.
*G06N 3/08* (2006.01)
*G06F 40/30* (2020.01)
(Continued)

(52) U.S. Cl.
CPC ............... *G06N 3/08* (2013.01); *G06F 17/16* (2013.01); *G06F 40/30* (2020.01); *G06K 9/6215* (2013.01);
(Continued)

(58) Field of Classification Search
CPC ........... G06N 3/08; G06F 40/30; G06F 17/16; G06K 9/6215; G06K 9/726; G10H 1/0008; G10L 15/16
See application file for complete search history.

(56) References Cited

U.S. PATENT DOCUMENTS 8,484,022 B1    7/2013   Vanhoucke
2012/0316660 A1  12/2012  Luo et al.
(Continued)

FOREIGN PATENT DOCUMENTS

CN   108334617 A   7/2018
CN   108648767 A   10/2018
(Continued)

OTHER PUBLICATIONS

McAuliffe et al., "Montreal Forced Aligner: trainable text-speech alignment using Kaldi," ISCA, (2017), pp. 498-502.
(Continued)

*Primary Examiner* — Alexey Shmatov
*Assistant Examiner* — Robert Bejcek, II
(74) *Attorney, Agent, or Firm* — Workman Nydegger

(57) ABSTRACT

A property vector representing extractable measurable properties, such as musical properties, of a file is mapped to semantic properties for the file. This is achieved by using artificial neural networks "ANNs" in which weights and biases are trained to align a distance dissimilarity measure in property space for pairwise comparative files back towards a corresponding semantic distance dissimilarity measure in semantic space for those same files. The result is that, once optimised, the ANNs can process any file, parsed with those properties, to identify other files sharing common traits reflective of emotional-perception, thereby rendering a more liable and true-to-life result of similarity/dissimilarity. This contrasts with simply training a neural network to consider (Continued)

extractable measurable properties that, in isolation, do not provide a reliable contextual relationship into the real-world.

7 Claims, 8 Drawing Sheets

(51) Int. Cl.

| | | |
|---|---|---|
| *G06F 17/16* | (2006.01) | |
| *G10L 15/16* | (2006.01) | |
| *G06K 9/62* | (2006.01) | |
| *G06K 9/72* | (2006.01) | |
| *G06N 3/04* | (2006.01) | |
| *G10H 1/00* | (2006.01) | |

(52) U.S. Cl.
CPC ............... *G06K 9/726* (2013.01); *G06N 3/04* (2013.01); *G06N 3/084* (2013.01); *G10H 1/0008* (2013.01); *G10L 15/16* (2013.01); *G06N 3/0454* (2013.01); *G06N 3/0481* (2013.01); *G10H 2210/071* (2013.01); *G10H 2210/081* (2013.01)

(56) References Cited

U.S. PATENT DOCUMENTS

| | | | |
|---|---|---|---|
| 2018/0052928 A1 | 2/2018 | Liu | |
| 2018/0276540 A1 | 9/2018 | King | |
| 2018/0349492 A1* | 12/2018 | Levy | ............. G06F 16/635 |
| 2020/0195983 A1* | 6/2020 | Chao | ............. G06F 16/745 |
| 2020/0320398 A1 | 10/2020 | Lyske et al. | |
| 2021/0012200 A1 | 1/2021 | Lyske et al. | |

FOREIGN PATENT DOCUMENTS

| | | |
|---|---|---|
| EP | 3336774 A1 | 6/2018 |
| WO | 2010027509 | 3/2010 |

OTHER PUBLICATIONS

Mei et al., "VideoReach: an online video recommendation system," pp. 767-768, Jan. 2007.
Mettes et al., "Spot on: Action Localization from Pointly-Supervised Proposals," arXiv:1604.07602v2 [cs.CV], (2016), 19 pages.
Muller et al., "Enhancing Similarity Matrices for Music Audio Analysis," IEEE 2006 (Year: 2006).
Nagrani et al., "Voxceleb: Large-scale speaker verification in the wild," Computer Speech & Language, vol. 60, (2020), pp. 101027, 15 pages.
Naphade et al., "Large-scale concept ontology for multimedia," In IEEE MultiMedia, vol. 13, No. 3, pp. 86-91, Jul.-Sep. 2006.
Non-Final Office Action received for U.S. Appl. No. 16/784,144, dated Jul. 24, 2020, 19 pages.
Pan et al., "Jointly Modeling Embedding and Translation to Bridge Video and Language," 10.1109/CVPR.2016.497, (2016), pp. 4594-4602.
Popaa et al., "Gender Representations and Digital Media," Procedia—Social and Behavioral Sciences, vol. 180, (2015), pp. 1199-1206.
Ramakrishna et al., "Linguistic analysis of differences in portrayal of movie characters," Proceedings of the 55th Annual Meeting of the Association for Computational Linguistics, (2017), pp. 1669-1678.
Rao et al., "A Local-to-Global Approach to Multi-modal Movie Scene Segmentation," 2020 IEEE/CVF Conference on Computer Vision and Pattern Recognition (CVPR), Jun. 2020, pp. 10146-10155.
Rao et al., "A Unified Framework for Shot Type Classification Based on Subject Centric Lens," arXiv:2008.03548v1 [cs.CV], Aug. 2020, 18 pages.
Rohrbach et al., "A Dataset for Movie Description," 015 IEEE Conference on Computer Vision and Pattern Recognition (CVPR), Boston, 2015, pp. 3202-3212.
Rohrbach et al., "Generating Descriptions with Grounded and Co-Referenced People," CVPR, (2017), pp. 4979-4989.
Rohrbach et al., "Movie Description," Int. J. Comput. Vis., (2017), vol. 123, pp. 94-120.
Rohrbach et al., "The Long-Short Story of Movie Description," arXiv:1506.01698v1 [cs.CV], (2015), 16 pages.
Sap et al., "Connotation Frames of Power and Agency in Modern Films," Proceedings of the 2017 Conference on Empirical Methods in Natural Language Processing, (2017), pp. 2329-2334.
Schedl et al., "VSD2014: A Dataset for Violent Scenes Detection in Hollywood Movies and Web Videos," IEEE, (2015), 6 pages.
Sharma et al., "Crossmodal learning for audio-visual speech event localization," arXiv:2003.04358v1 [cs.CV], Mar. 2020, 16 pages.
Sharma et al., "Multichannel attention network for analyzing visual behavior in public speaking," IEEE Winter Conference on Applications of Computer Vision, (2018), pp. 476-484.
Sharma et al., "Toward Visual Voice Activity Detection for Unconstrained Videos," IEEE, (2019), pp. 2991-2995, 10.1109/ICIP.2019.8803248.
Simoes et al., "Movie Genre Classification with Convolutional Neural Networks," International Joint Conference on Neural Networks (IJCNN), (2016), pp. 259-266.
Somandepalli et al., "Multi-Face: Self-supervised Multiview Adaptation for Robust Face Clustering in Videos," arXiv:2008.11289v1 [cs.CV], (2020), 17 pages.
Somandepalli et al., "Multimodal Representation of Advertisements Using Segment-level Autoencoders," ICMI'18, (2018), pp. 418-422.
Somandepalli et al., "Reinforcing self-expressive representation with constraint Propagation for face clustering in movies," ICASSP, (2019), pp. 4065-4069, 10.1109/ICASSP.2019.8682314.
Somandepalli et al., "Unsupervised Discovery of Character Dictionaries in Animation Movies," IEEE Transactions on Multimedia, vol. 20, No. 3, (2018), pp. 539-551.
Sun et al., "VideoBERT: A Joint Model for Video and Language Representation Learning," ICCV, (2019), pp. 7464-7473, 10.1109/ICCV.2019.00756.
Torabi et al., "Learning Language-Visual Embedding for Movie Understanding with Natural-Language," arXiv:1609.08124v1 [cs.CV], Sep. 2016, 13 pages.
Vicol et al., "MovieGraphs: Towards Understanding Human-Centric Situations from Videos," CVPR, (2018), pp. 8581-8590.
Wehrmann et al., "Movie genre classification: A multi-label approach based on convolutions through time," Applied Soft Computing, vol. 61, (2017), pp. 973-982.
Weng et al., "RoleNet: Movie Analysis from the Perspective of Social Networks," in IEEE Transactions on Multimedia, vol. 11, No. 2, pp. 256-271, Feb. 2009.
Xu et al., "MSR-VTT: A Large Video Description Dataset for Bridging Video and Language," CVPR, (2016), 9 pages, 10.1109/CVPR.2016.571.
Xu et al., "Show, Attend and Tell: Neural Image Caption Generation with Visual Attention," Proceedings of the 32nd International Conference on Machine Learning, (2015), vol. 37, (2015), 10 pages.
Zhou et al., "Learning Deep Features for Discriminative Localization,"2016 IEEE Conference on Computer Vision and Pattern Recognition (CVPR), Las Vegas, NV, 2016, pp. 2921-2929.
Zhou et al., "Movie Genre Classification via Scene Categorization," pp. 747-750, 10.1145/1873951.1874068.
Zhou et al., "Places: A 10 Million Image Database for Scene Recognition," IEEE Trans. On Pattern Analysis and Machine Intelligence, vol. 40, No. 6, (2018), pp. 1452-1464.
Aafaq et al., "Video Description: A Survey of Methods, Datasets, and Evaluation Metrics," ACM Computing Surveys, vol. 52, No. 6, Article 115, (2019), pp. 37 pages.
Aggarwal, "Evaluating Recommender Systems, Chapter 7," Springer International Publishing Switzerland, (2016), pp. 225-254.
Akleman et al., "A Theoretical Framework to Represent Narrative Structures for Visual Storytelling," 2015, pp. 129-136., 10.13140/RG.2.1.3887.3440.

(56) References Cited

OTHER PUBLICATIONS

Aljanaki et al., "A Data-Driven Approach to Mid-Level Perceptual Musical Feature Modeling," 19th International Society for Music Information Retrieval Conference, Paris, France, 2018. (Year: 2018).
Bahdanau et al., "Neural Machine Translation by Jointly Learning to Align and Translate," Published as a conference paper at ICLR 2015, 15 pages.
Bain et al., "Condensed Movies: Story Based Retrieval with Contextual Embeddings," May 2020, 21 pages.
Baltrusaitis et al., "Multimodal Machine Learning: A Survey and Taxonomy," IEEE Transactions on Pattern Analysis and Machine Intelligence, vol. 41, No. 2, Feb. 2019, pp. 423-443.
Barrington et al., "Audio Information Retrieval using Semantic Similarity", 2007 IEEE International Conference on Acoustics, Speech, and Signal Processing Apr. 15-20, 2007, pp. 11-725.
Baruah et al., "A knowledge transfer and boosting approach to the prediction of Affect in movies," 2017 IEEE International Conference on Acoustics, Speech and Signal Processing (ICASSP) (2017), pp. 2876-2880.
Baveye, "Automatic Prediction of Emotions Induced by Movies," Other. Ecole Centrale de Lyon, (2015), 163 pages.
Bojanowski et al., "Finding Actors and Actions in Movies," 2013 IEEE International Conference on Computer Vision, Sydney, NSW, 2013, pp. 2280-2287.
Borges et al., "Video-Based Human Behavior Understanding: A Survey," IEEE Transactions on Circuits and Systems for Video Technology, vol. 23, No. 11, (2013), pp. 1993-2008.
Bushman et al., "Short-term and Long-term Effects of Violent Media on Aggression in Children and Adults," Arch. Pediatr. Adolesc. Med., vol. 160, (2006), pp. 348-352.
Cao et al., "VGGFace2: A dataset for recognising faces across pose and age," 13th IEEE International Conference on Automatic Face & Gesture Recognition, (2018), pp. 67-74.
Cascante-Bonilla et al., "Moviescope: Large-scale Analysis of Movies using Multiple Modalities," arXiv:1908.03180v1 [cs.CV], Aug. 2019, 10 pages.
Charbuillet, Christophe & Tardieu, Damien & Peeters, Geoffroy. (2011). GMM supervector for Content Based Music Similarity.
Chaudhuri et al., "AVA-Speech: A Densely Labeled Dataset of Speech Activity in Movies," arXiv:1808.00606v2 [cs.SD], (2018), 5 pages.
Chen et al., "Vggsound: A Large-Scale Audio-Visual Dataset," ICASSP, IEEE, (2020), 721-725.
Chung et al., "VoxCeleb2: Deep Speaker Recognition," eiarXiv: 1806.05622v2 [cs.SD], (2018), 6 pages.
Deldjoo et al., "Movie genome: alleviating new item cold start inmovie recommendation," User Modeling and User-Adapted Interaction, vol. 29, (2019), pp. 291-343.
Diba et al., "Large Scale Holistic Video Understanding," arXiv:1904. 11451v2 [cs.CV], (2019), 10 pages.
Eyben et al., "Real-Life Voice Activity Detection With Lstm Recurrent Neural Networks and an Application to Hollywood Movies," 2013 IEEE International Conference on Acoustics, Speech and Signal Processing, 2013, pp. 483-487.
Gemmeke et al., "Audio Set: An ontology and human-labeled dataset for audio events," 2017, pp. 776-780, 10.1109/ICASSP.2017. 7952261.
Ghaleb et al., "Accio: A Data Set for Face Track Retrieval in Movies Across Age," ICMR '15, (2015), pp. 455-458.
Goyal et al., "A multimodal mixture-of-experts model for dynamic emotion prediction in movies," 2016, pp. 2822-2826, 10.1109/ ICASSP.2016.7472192.
Gu et al., "AVA: A Video Dataset of Spatio-temporally Localized Atomic Visual Actions," CVPR, (2018), pp. 6047-6056.
Guha et al., "Computationally deconstructing movie narratives: An informatics approach," 2015 IEEE International Conference on Acoustics, Speech and Signal Processing (ICASSP), Brisbane, QLD, 2015, pp. 2264-2268.

Guha et al., "Gender Representation in Cinematic Content: A Multimodal Approach," pp. 31-34, (2015), 10.1145/2818346. 2820778.
Guo et al., "MS-Celeb-1M: A Dataset and Benchmark for Large-Scale Face Recognition," 9907, Jul. 2016, pp. 87-102.
Hanjalic, "Extracting moods from pictures and sounds: towards truly personalized TV," in IEEE Signal Processing Magazine, vol. 23, No. 2, pp. 90-100, Mar. 2006.
Hebbar et al., "Robust speech activity detection in movie audio: data resources and Experimental evaluation," ICASSP, (2019), pp. 4105-4109, 10.1109/ICASSP.2019.8682532.
Huang et al., "A Graph-Based Framework to Bridge Movies and Synopses," ICCV, (2019), pp. 4592-4601.
Huang et al., "Caption-Supervised Face Recognition: Training a State-of-the-Art Face Model without Manual Annotation," The Chinese University of Hong Kong, Aug. 2020, 17 pages.
Huang et al., "From Trailers to Storylines: An EfficientWay to Learn from Movies," arXiv:1806.05341v1 [cs.CV], (2018), 9 pages.
Huang et al., "MovieNet: A Holistic Dataset for Movie Understanding," arXiv:2007.10937v1 [cs.CV], (2020), 58 pages.
Huang et al., "Person Search in Videos with One Portrait Through Visual and Temporal Links," ECCV, (2018), 17 pages.
Huang et al., "Unifying Identification and Context Learning for Person Recognition," CVPR, (2018), pp. 2217-2225.
Hussain et al., "Automatic Understanding of Image and Video Advertisements," 2017 IEEE Conference on Computer Vision and Pattern Recognition (CVPR), 2017, pp. 1705-1715.
Joosten et al., "Visual Voice Activity Detection at different Speeds," Proceedings of the 12th international conference on auditory-visual speech processing (AVSP 2013), pp. 187-190.
Karkkainen et al., "FairFace: Face Attribute Dataset for Balanced Race, Gender, and Age," arXiv:1908.04913v1 [cs.CV], (2019), 11 pages.
Kim et al., "Trends in Advertising Research: A Longitudinal Analysis of Leading Advertising, Marketing, and Communication Journals, 1980 to 2010," Journal of Advertising, vol. 43, No. 3, 2014, pp. 296-316.
Kulshreshtha et al., "Dynamic character graph via online face clustering for movie analysis," Multimedia Tools and Applications, vol. 79, (2020), pp. 33103-33118.
Kumar et al., "Robust multichannel gender classification from speech in movie audio," Interspeech, (2016), pp. 2233-2237.
Laptev et al., "Learning realistic human actions from movies," 2008 IEEE Conference on Computer Vision and Pattern Recognition, 2008, pp. 1-8.
Levi et al., "Age and Gender Classification using Convolutional Neural Networks," Department of Mathematics and Computer Science, (2015), pp. 34-42.
Li et al., "The "Celeb" Series: A Close Analysis of Audio-Visual Elements in 2008 U.S. Presidential Campaign Ads," Undergraduate Journal of Humanistic Studies, Winter, vol. 4, (2017), 16 pages.
Luong et al., "Effective Approaches to Attention-based Neural Machine Translation," arXiv:1508.04025v5 [cs.CL], (2015), 11 pages.
Maharaj et al., "A dataset and exploration of models for understanding video data through fill-in-the-blank question-answering," CVPR, (2017), pp. 6884-6893.
Malandrakis et al., "Affect extraction using aural, visual and linguistic features from multimedia documents," A thesis submitted for the degree of Master of Science, 2012, 114 pages.
Martinez et al., "Violence Rating Prediction from Movie Scripts," The Thirty-Third AAAI Conference on Artificial Intelligence (AAAI-19), (2019), pp. 671-678.
GB Patent Office, Combined Search and Examination Report under Sections 17 and 18(3), GB Application No. GB1904713.3, dated Oct. 2, 2019.
GB Patent Office, Combined Search Report under Section I 7(5)(b) and Abbreviated Examination Report under Section 18(3), GB Application No. GB1904716.6, dated Sep. 20, 2019.
Final Office Action received for U.S. Appl. No. 16/784,144, dated Nov. 3, 2020, 23 pages.

(56) References Cited

OTHER PUBLICATIONS

Kuo et al., "Using Deep Convolutional Neural Networks for Image Retrieval," IS&T International Symposium on Electronic Imaging 2016 (Year: 2016).
Suzuki et al., "A similarity-based neural network for facial expression analysis," Pattern Recognition Letters 28 (2007) 1104-1111 (Year: 2007).
Activation Functions in Neural Networks, https://towardsdatascience.com/activation-functions-neural-networks-1cbd9f8d91d6, Jan 20, 2021.
Advisory Action received for U.S. Appl. No. 16/784,144, dated Jan. 21, 2021, 3 pages.
B. S. Manjunath, J. -. Ohm, V. V. Vasudevan and A. Yamada, "Color and texture descriptors," in IEEE Transactions on Circuits and Systems for Video Technology, vol. 11, No. 6, pp. 703-715, Jun. 2001, doi: 10.1109/76.927424.
Bark scale, https://en.wikipedia.org/wiki/Bark_scale#Bark_Scale_Critical_bands, accessed Jan. 21, 2021.
BeatsLoudness, https://essentia.upf.edu/reference/std_BeatsLoudness.html, accessed Jan. 20, 2021.
BeatTrackerMultiFeature, https://essentia.upf.edu/reference/std_BeatTrackerMultiFeature.html, accessed Jan. 20, 2021.
BpmHistogramDescriptors, https://essentia.upf.edu/reference/std_BpmHistogramDescriptors.html, accessed Jan. 20, 2021.
C. Bhat and S. K. Kopparapu, "FEMH Voice Data Challenge: Voice disorder Detection and Classification using Acoustic Descriptors," 2018 IEEE International Conference on Big Data (Big Data), Seattle, WA, USA, 2018, pp. 5233-5237, doi: 10.1109/BigData.2018.8622543.
ChordsDescriptors, https://essentia.upf.edu/reference/std_ChordsDescriptors.html, accessed Jan. 21, 2021.
Crest, https://essentia.upf.edu/reference/streaming_Crest.html, accessed Jan. 20, 2021.
Danceability, https://essentia.upf.edu/reference/std_Danceability.html, accessed Jan. 20, 2021.
Dissonance, https://essentia.upf.edu/reference/std_Dissonance.html, accessed Jan. 21, 2021.
DistributionShape, https://essentia.upf.edu/reference/std_DistributionShape.html, accessed Jan. 21, 2021.
DynamicComplexity, https://essentia.upf.edu/reference/std_DynamicComplexity.html, accessed Jan. 21, 2021.
EnergyBand, https://essentia.upf.edu/reference/std_EnergyBand.html, accessed Jan. 21, 2021.
Entropy, https://essentia.upf.edu/reference/std_Entropy.html, accessed Jan. 20, 2021.
FlatnessDB, https://essentia.upf.edu/reference/std_FlatnessDB.html, accessed Jan. 21, 2021.
Flux, Jan 21, 2021, https://essentia.upf.edu/reference/std_Flux.html, accessed Jan. 21, 2021.
Glossary of Musical Terms, https://www.naxos.com/education/glossary.asp?char=P-R#, accessed Jan. 14, 2021.
HFC, https://essentia.upf.edu/reference/std_HFC.html, accessed Jan. 21, 2021.
HPCP, https://essentia.upf.edu/reference/std_HPCP.html, accessed Jan. 20, 2021.
KeyExtractor, https://essentia.upf.edu/reference/std_KeyExtractor.html, accessed Jan. 20, 2021.
Music extractor, https://essentia.upf.edu/streaming_extractor_music.html, accessed Jan. 14, 2021.
OnsetRate, https://essentia.upf.edu/reference/std_OnsetRate.html, accessed Jan. 20, 2021.
P. Manocha, R. Badlani, A. Kumar, A. Shah, B. Elizalde and B. Raj, "Content-Based Representations of Audio Using Siamese Neural Networks," 2018 IEEE International Conference on Acoustics, Speech and Signal Processing (ICASSP), Calgary, AB, 2018, pp. 3136-3140, doi: 10.1109/ICASSP.2018.8461524.
PitchSalience, https://essentia.upf.edu/reference/std_PitchSalience.html, accessed Jan. 21, 2021.
Rectifier (neural networks), https://en.wikipedia.org/wiki/Rectifier_(neural_networks), accessed Jan. 20, 2021.
Search with an image on Google, https://support.google.com/websearch/answer/1325808?hl=en, accessed Jan. 14, 2021.
SpectralComplexity, https://essentia.upf.edu/reference/std_SpectralComplexity.html, accessed Jan. 21, 2021.
SpectralContrast, https://essentia.upf.edu/reference/std_SpectralContrast.html, accessed Jan. 21, 2021.
StrongPeak, https://essentia.upf.edu/reference/std_StrongPeak.html, accessed Jan. 21, 2021.
TuningFrequency, https://essentia.upf.edu/reference/std_TuningFrequency.html, accessed Jan. 20, 2021.
Wiggins, G. A. et al, On the non-existence of music: Why music theory is a figment of the imagination., Mar. 1, 2010, Musicae Scientiae, 231-235.
ZeroCrossingRate, https://essentia.upf.edu/reference/std_ZeroCrossingRate.html, accessed Jan. 21, 2021.

\* cited by examiner

METHOD OF TRAINING A NEURAL NETWORK TO REFLECT EMOTIONAL PERCEPTION AND RELATED SYSTEM AND METHOD FOR CATEGORIZING AND FINDING ASSOCIATED CONTENT

CROSS-REFERENCE TO RELATED APPLICATIONS

This application claims benefit of and priority to United Kingdom Application No. 1904713.3, filed Apr. 3, 2019, United Kingdom Application No. 1904716.6, filed Apr. 3, 2019, and United Kingdom Application No. 1904719.0, filed Apr. 3, 2019, all of which are incorporated herein by reference in their entirety.

BACKGROUND TO THE INVENTION

This invention relates, in general, to artificial intelligence and an ability of a neural network to be trained to reflect human subjective responses to sensory stimuli such as audio particularly in the form of music or image data (whether static or video), and/or subjective contextual input such as a description of smell or a piece of text. More particularly, but not exclusively, the present invention relates to artificial intelligence that realizes an identification system capable of categorizing and reliably identifying—in an emotionally-perceptive semantic sense—perceived commonality or dissimilarity between contextual properties of songs or images to allow a user of, typically, a multimedia device to search for and locate, from an extensive catalogue, a ranked order of data files sharing commonality. Even more particularly, the present invention relates to a system and operating methodology that locates selectable audio content, objectively categorizes or critiques an initial subjective assessment of a track (or sections thereof) and promotes, in the sense of selectively "pushing" content, access to categorized content that commonly shares user-selectable perception about musical themes.

SUMMARY OF THE PRIOR ART

One of the most challenging long-term objectives for artificial intelligence "AI", typically based on an artificial neural network architecture, is to replicate human intellectual behaviour. This is a complex proposition not least because human opinion is based on subjective responses to stimuli and existing approaches in AI do not correlate well with emotional perspective responses. Rather, the rationale for the computing architecture in AI is implication of a most likely response based on assimilation of large quantities of data that have objectively discernible properties.

Refinement, i.e. training, of a deep neural network "DNN" is frequently based on the concept of "backpropagation", i.e. the backward propagation of errors, to calculate a gradient that is needed in the DNN's calculation of the weights to be used in the network, as will be understood. The DNN therefore moves through its layers, as will be understood, calculate the probability of each output in an attempt to find the correct mathematical manipulation that turns the input into the output irrespective of whether it be a linear relationship or a non-linear relationship.

As a practical example of the current limited approach in AI to music interpretation, identification of perceived similarity between different pieces of music is constrained to absolute similarities rather than being related to semantically-perceived similarities. This may, at first inspection, not appear problematic, but on an intellectual and real footing a fundamental problem remains because "there is no such thing as music, except as created, perceived, and experienced in the human mind. In other words, "Music, in its own right, does not exist . . . because neither music nor language can be studied as pure surface forms because the cognition of both produces information which is not contained in the surface form". This proposition is established in the paper "On the non-existence of music: why music theory is a figment of the imagination" by Geraint A. Wiggins et al in ESCOM European Society for the Cognitive Sciences of Music, Musicæ Scientiæ, Discussion Form 5, 2010, pages 231-255. Hence, existing AI modelling that, from its outset, is based on a degree of absoluteness (based on the interpretation of measured parameters) is fatally flawed with the consequence that it will generate, in the exemplary context of a musical search tool, inconsistent and/or spurious results.

The same problems exist with the identification and categorization of other forms of expression, such as paintings or photographs or indeed interpretations of imagery, such as medical CT scans, or other purely descriptive expressions (such as a description of a smell, a medical report or an outline of a plot in a work of fiction) to locate and assess, relative to a defined start point (e.g. a particular description of a fragrance or the tonality, rhythm and timbre of a musical composition), the relevance of searchable electronic images and/or data that are either entirely unrelated or otherwise are potentially relevant to one another from the perspective of having an acceptably close set of subjective attributes, qualities or characteristics.

In fact, existing AI systems cannot resolve semantically-relevant attributes and therefore can both overlook semantic similarities whilst accepting or suggesting that perceptually-distinct dissimilarities are closely related.

The music, film and gaming industry—and particularly aspects relating to the provision of content—is evolving. In this respect, the sale or distribution of (for example) music or soundtracks as either streamed or downloaded digital files is becoming dominant in those markets. This contrasts with the sale of compact disc and DVD' technologies (or, historically, vinyl disks) through established, but now waning, custom retail outlets.

Whilst music sales are commercial and content perceptual and aesthetic in nature, there is no existing, straightforward and reliable mechanisms to locate tracks that share common musical characteristics honed to an individual's specific tastes. To qualify this statement, music is broadly categorised in terms of its genre, e.g. jazz, rock, classical and blues to name but a few, but within each of these genres there usually exist vast numbers of sub-categories or sub-species. For example, there are apparently at least thirty different forms of jazz, including free-funk, crossover, hard bop and swing. These sub-species may share some overarching similarities in user-discernible compositional architectures that define the genus, but frequently there are also significant dissimilarities that are sufficiently audibly or musically pronounced. To provide further context, two different species of jazz may perceptually be so profoundly audibly different for a particular listener to conclude that one is likeable whereas the other is not. By the same (but reverse) token, a listener may prematurely disregard (or simply just not be aware that) a piece of classical music based on a flawed perception that its listening characteristics [in musical space and in a musical sense] should be disparate to those orchestrated a piece of hard rock when, in fact, these two different audio tracks are substantially identical in terms of their closeness in musical space.

With typically online music libraries each containing millions of songs—the iTunes and Tidal® music libraries allegedly each contain around fifty million tracks—the problem exists about how these databases can be effectively searched to identify user-perceived common musical themes, traits or features between myriad tracks potentially spanning entirely different genres. Consequently, a search for similar music could—and, to date, indeed frequently does—discount entire genres [or at least sub-species of a genre] from consideration and/or fails to associate together extremely relevant musical content in different tracks from different genres. Commercial libraries can make use of "collaborative filtering" in which recommendations are made based on the playlists of other users who have listened to the same song, but this approach depends heavily on stored user data and statistical usage. Collaborative filtering can reflect the personal preferences of a listener/user of the library, but it is limited by the amount of user data available and so is not in itself a complete solution.

There is also the issue of "cold start" which arises when a new (in the sense of an unknown or little known) artist [i.e. a novice, newcomer or "newbie" potentially signed by a recording studio or label] releases their first audio track or first album. The problem is that the artist is unknown and therefore has no effective following either on-line or elsewhere, such as acquired listeners from promotion over the radio aether or television. Expressing this differently, the lack of a listening history provides a roadblock both to making recommendations, such as through collaborative filtering, or establishing a reputation and following for the newbie. The problems for the distributor, e.g. a record label, are how do they raise awareness of the new artist, how do they categorize the nature [which arguably is variable since it is user-perceivable] of the new artist's music and, in fact, how do they link/insert the music into an existing music library so that it is listened to, downloaded or streamed to ensure maximum exposure for commercialization reasons? The problem for the listening and/or streaming public or radio stations is that, in the context of these newbies, 'they don't know what they don't know' so the probability of randomly finding the newbie's initial foray into the world of music is slim and based more on luck than judgement.

For the distributor, effective exposure of and access to the artist's musical tracks equates to an increased likelihood of sales. Indeed, from a commercial perspective, it is also desirable to avoid a "slow burn" and therefore rapidly to grow the reputation of a new artist.

In short, the new artist must break into the market with an unproven and new product. In contrast, fans of existing artists will invariably follow, i.e. both monitor and generally be inclined to purchase, newly-released music from those existing artists irrespective of whether such newly-released music is good or bad. Indeed, even with poor critical acclaim, newly-released music from a popular artist will be streamed, listened to and/or purchased so the "cold start" problem does not exist for existing artists with an established following and listener base. The cold-start problem therefore stifles dissemination of music and also the potential evolution of new form of music.

In addition, the nature of user perception and musical appreciation is a rapidly employed personal trait. Particularly, a listener will make an assessment about whether a track is palatable and preferably to their individual taste within a few seconds of the track (or a section thereof) being played/heard. Consequently, any track finding recommendation scheme, realised for example as a downloadable app, must be intrinsically quick (in terms of identifying a recommendation) and also reliable in that any recommendation it makes needs to satisfy user-perceived musical values, i.e. personal musical tastes. Any track finding recommendation tool that throws up seemingly random tracks, such as those of existing systems that make use of statistical analysis of demographic data by other users with identified common interests or circumstances (e.g. age range 30-40, married with two children, working as an accountant and living in a mortgaged property in Staten Island, N.Y.), is ultimately poor and its use disregarded or discounted. Perceptual categorization of musicologically-similar audio tracks, irrespective of genre, is therefore an important consideration for effective audio track finding technologies.

The problems identified above are not addressed by existing apps such as Shazam and SoundHound® since these apps focus on identification of an audio track that is sampled in real-time or otherwise these apps list tracks that others in the community are discovering. With SoundHound®, a song can be sung or hummed to try to identify it. These apps therefore identify the track being played/sampled or, based on reported hard numbers, they may make a recommendation for potential further listening that, frequently, is not overly relevant. These existing apps provide no perception of musicological similarities into myriad tracks in a music library.

Another of the issues faced by the music industry is how best to augment the listener/user experience, especially on a personal/individual level. Indeed, it has long been recognized that the contextual relevance of or relationship between a piece of music and an event brings about recognition or induces a complementary emotional response, e.g. a feeling of dread or suspense during a film or a product association arising in TV advertising.

Identification of common musical traits is desirable because it has been recognized that appropriate use of musical content supports emotional, physiological and/or psychological engagement of the listener and therefore promotes the listener's sensory experience. This is, for example, relevant to game developers and/or advert or film trailer producers/editors who are tasked with rapidly compiling a suitable multimedia product that aligns relevant music themes, such as increasing musical intensity (in the context of an increasing sense of developing drama and urgency and not necessarily in the context of an absolute audio power output level) with video output. In providing at least one resultant "proof" for review, the developer or editor has already expended considerable time in identifying potentially suitable music and then fitting/aligning the selected music to the video. To delay having to identify a commercially-usable audio track, content developers presently may make use of so-called "temp tracks" that are often well-known tracks having rights that cannot be easily obtained, but this is just a stop-gap measure because a search is then required to identify a suitable commercially-viable track for which use rights can be obtained. Further time delays then arise from the instructing client having to assessing whether the edit fits with their original brief. Therefore, an effective track searching tool would facilitate identification of a selection of alternative musical tracks for alignment with, for example, a visual sequence or the building of a musical program (such as occurs within "spin" classes that choreograph cycling exercise to music to promote work rates).

Technology does exist on the web to search for images having identical or similar visual characteristics, including identifying websites that present such identical or related images. For example, Google® supports a computer program application [sometimes foreshortened to the term "app"] called "Reverse Image Search" (see https://support.google.com/websearch/answer/1325808hl=en) in which an uploaded image is apparently broken down into groups of constituent bits, at a server, and those groups of bits searched to identify related images according to some form of logical distance measure within a defined parameter space. Identified related images are then provided to the user who made use of the app and who uploaded the original image.

Whilst image comparison requires complex computations (typically based on a neural network), it is observed that the fundamental source document can be broken down into shapes, colour(s) and/or dimensions, such as angles or lengths. Contrasting of one or more of these factors allows for association to be established, e.g. through relative scaling. In contrast, a critique of musical characteristics, although again making use of a neural network, has to date been generally hampered by the difficulties in resolving perceptually more subtle differences in musical structures.

SUMMARY OF THE INVENTION

According to a first aspect of the invention there is provided a method of training an artificial neural network "ANN" in a system configured to identify similarity or dissimilarity in content of a first data file relative to content in a different data file, the method comprising: for a selected pair of different data files, extracting measurable signal qualities from each of the first data file and the different data file, and identifying a plurality of properties from those measurable signal qualities; at an output of the ANN tasked with processing a property, generating a corresponding property vector in property space for each property of the first data file and the different data file of the selected pair; assembling a first multi-dimensional vector for the first data file and a distinct second multi-dimensional vector for the different data file, wherein each multi-dimensional vector is obtained from assembling respective property vectors from outputs of the ANN; determining a distance measure between the first multi-dimensional vector and the second multi-dimensional vector; in response to said determined distance measure, adjusting weights and/or bias values the ANN by a backpropagation process that takes into account identified discrepancies arising between said determined distance measure in property space and quantified semantic dissimilarity distance measures assessed in semantic space for the first data file relative to the different data file, thereby training the system by valuing semantic perception reflected in the quantified semantic dissimilarity distance measures over property assessment reflected by the distance measure between the first multi-dimensional vector and the second multi-dimensional vector.

The quantified semantic dissimilarity distance measures assessed in semantic space may be based on a vectorial representation of a textual explanation associated with each of the first data and the different data file. The textual explanation may be coded into metadata of the respective file.

In a preferred embodiment, assessment of the quantified semantic dissimilarity distance measures includes: applying natural language processing "NLP" to a text description to generate semantic vectors for a multiplicity of N data files in a training set; calculating, for the training set and on a pairwise basis, a separation distance between each semantic vector; for each of the files in the training set, identifying the smallest and largest separation distances relative to other files in the training set; creating, for each file in the training set, a set of pairs in which a first pair has the smallest separation distance and a second pair has the largest separation distance; assigning a first value representing semantic closeness to the first pair and assigning a second value representing semantic dissimilarity to the second pair, wherein the second value is different to the first value.

The first pair may be the first data file and the different data file.

The method of training may involve, for a subset comprising the m smallest separation distances and the m largest separation distances, assigning the first value to the m smallest and the second value to the m largest, where m is a positive integer less than N.

In a second aspect of the present invention there is provided a method of training and operating an artificial neural network "ANN" configured to identify similarity or dissimilarity in content between data files containing one or more of audio content and image content, the method comprising: associating quantified semantic dissimilarity measures for said content of said data files in semantic space with related property separation distances in property space for measurable properties extracted for that content, and training and operating the system to value semantic dissimilarity measures over measurable properties.

The quantified semantic dissimilarity measures assessed in semantic space can be based on vectorial representations of textual explanations associated with different data files.

In a preferred embodiment the data files are audio files and the measurable properties are musical properties defined by properties relating to rhythm, tonality, timbre and musical texture.

The quantified semantic dissimilarity measures may be obtained by: applying natural language processing "NLP" to a text description to generate semantic vectors for a multiplicity of N data files in a training set; calculating, for the training set and on a pairwise basis, a separation distance between each semantic vector; for each of the files in the training set, identifying the smallest and largest separation distances relative to other files in the training set; creating, for each file in the training set, a set of pairs in which a first pair has the smallest separation distance and a second pair has the largest separation distance; assigning a first value representing semantic closeness to the first pair and assigning a second value representing semantic dissimilarity to the second pair, wherein the second value is different to the first value.

The first pair can be the first data file and the different data file.

In one particular embodiment, for a subset comprising the m smallest separation distances and the m largest separation distances, the method may include assigning the first value to the m smallest and the second value to the m largest, where m is a positive integer less than N.

The method of training an operating an ANN may further include: storing, in a database, file identifiers permitting identification of individual files for which dissimilarity has been assessed according to the method of any preceding claim; and against stored file identifiers, recording at least one of distance relationships to other identified files in the database and calculated property vectors for the individual files.

The database may be a network-accessible database, or in memory or a storage device local to a user-device.

In some embodiments the method further comprises: during training of the neural network having a plurality of processing branches, differentiating between different processing branches assigned to process different properties of a file to generate respective property vectors in property space, wherein differentiating includes: identifying relative similarity and dissimilarity in respective property vectors for pairwise contrasted files undergoing pairwise comparison; and promoting adjustment of at least one of bias values and weights in a specific processing branch in which greatest dissimilarity is experienced in generated property vectors of the pairwise comparison.

Relatively greater significance may be assigned to a specific processing branch of the plurality of processing branches when properties in the pairwise comparison are assessed to be relatively similar rather than relatively dissimilar.

The quantified semantic dissimilarity distance measures can be obtained from natural language processing of related descriptive content for the file. The descriptive content can be contained in metadata of the file.

In a particular embodiments of the various aspects, the data files contain audio and the properties are musical properties and the measurable signal qualities define properties relating to rhythm, tonality, timbre and musical texture.

In another aspect of the present invention there is provided a method of identifying files sharing common user-perceivable qualities, the method comprising assessing a target file for closeness to stored files in a file library containing a multiplicity uniquely identified files having associated property vectors, the method comprising: in a neural network, processing the target file to generate a multi-dimensional property vector in property space, the multi-dimensional property vector comprised from a plurality of property vectors derived from multiple different sets of measurable signal qualities extracted selectively from the target file and wherein the plurality of property vectors are each weighted by the neural network to measures of semantic dissimilarity; and generating an ordered list of files from the library based on closeness between the multi-dimensional property vector of the target file with the property vectors of files in the library.

In a third aspect of the present invention there is provided a method of identifying semantically close data files using a neural network, the method comprising: in the identification of semantically close files, in the neural network valuing semantic perception reflected in quantified semantic dissimilarity distance measures as more important than property assessment reflected by distance measures (330) of extracted measurable signal qualities.

In a further aspect of the present invention there is provided a computer program comprising code that, when executed by processor intelligence, performs the method of various aspects as recited herein and, particularly, in the claims.

In another aspect of the invention there is provided an artificial neural network "ANN" containing layers of interconnected neurons arranged to apply, to content presented to the ANN in the form of at least one of audio content and image content, weights and biases configurably selected by backpropagation, wherein the ANN correlates quantified semantic dissimilarity measures for said content in semantic space with related property separation distances in property space for measurable properties extracted for that content to provide an output that is adapted, over time, to align a result in property space to a result in semantic space and wherein the ANN is configured, during adaptation of said weights and biases, to value semantic dissimilarity measures over measurable properties.

In yet another aspect of the present invention there is provided an artificial neural network "ANN" containing layers of interconnected neurons arranged to apply, to content presented to the ANN in the form of at least one of audio content and image content, weights and biases that are selectively configured by backpropagation to correlate quantified semantic dissimilarity measures for said content measured in semantic space with related property separation distances in property space for measurable properties extracted for that content and processed by said neurons of the ANN such that the ANN is configured to value semantic dissimilarity measures over measurable properties in its application of said weights and biases.

In still yet another aspect of the invention there is provided an artificial neural network "ANN" containing an input layer of neurons coupled to an output layer of neurons, wherein said neurons are arranged to apply weights and biases to data received thereby, and wherein the ANN is: configured to generate weights and biases for neurons so as to correlate alignment of the output of the ANN in property space with reference semantic dissimilarity measures prior measured for reference comparative descriptive content in semantic space, and wherein the property space is determined by processing by the ANN of measurable properties extracted from audio and/or image content of a file that is applied to the input.

The input layer is typically separated from the output layer by at least one hidden layer.

There is also provided, an in further aspect of the invention, a system comprising: a) a plurality of artificial neural network outputs arranged to provide a plurality of property vectors and wherein said property vectors are extracted measurable signal qualities from content of a first data file; b) at least one convolution neural network arranged to provide a further property vector, wherein the further property vector is derived from a two-dimensional representation of the content of the first data file; c) a database containing a plurality of uniquely identifiable data files each having a reference vector, wherein each reference vector is assembled from property vectors obtained from (a) extracted measurable signal qualities obtained from content of its data file and (b) a further property vector obtained from a two-dimensional representation of the content of its data file; and d) processing intelligence configured: to generate, for the first data file, a multi-dimensional property vector from the plurality of property vectors and the further property vector; to compare the multi-dimensional property vector with said plurality of reference vectors in the database; and to identify at least one unique file identifier having a reference vector identified as measurably similar to that of the multi-dimensional property vector of the first file, thereby identifying a different second data file in the database that is semantically close to the first data file.

The plurality of property vectors is each weighted by a neural network to reflect semantic dissimilarity.

The system can include a network connection and a communication unit, wherein the processing intelligence causes the communication unit to send the different second data file across the network connection to an interactive user device. A user interface can be provided to select a user-prioritized quality for searching.

In another aspect of the invention there is provided a system comprising: a) a plurality of artificial neural network outputs arranged to provide a plurality of property vectors for a data file and wherein said property vectors are extracted measurable signal qualities from content of the data file; b) at least one convolution neural network arranged to provide a further vector that is assembled with the plurality of property vectors to generate a multi-dimensional property vector; c) processing intelligence arranged to receive first and second different multi-dimensional property vectors for a pair of data files including the first data file and a different data file and, in response thereto, to produce a distance measure between the first and second different multi-dimensional property vectors; and d) processing intelligence configured to resolve whether the distance measure in property space correlates to a reference distance generated for the first and second vectors in semantic space, the reference distance based on semantic dissimilarity measurements for reference comparative descriptive content for the pair of data files.

The processing intelligence functions to associates quantified semantic dissimilarity measures for said content in semantic space with related property separation distances in property space for measurable properties extracted for that content.

In yet another aspect of the invention there is provided a predictive system trained by creating a multiplicity of pairs of independent vectors representing human-perceived qualities and measurable qualities of electronic source files, wherein: a first vector is generated in semantic space and based on measured dissimilarities in human-generated descriptions between pairs of source files such that the first vector provides a user-centric perception of pairwise closeness; and the second vector is obtained from pairwise comparison of measurable properties extracted from content of the same pair of source files; and the predictive system includes processing intelligence arranged to adapt a generation process for the second vector so that pairwise distances for the first vector approach the pairwise distance for the second vector.

The electronic source files include at least one of: digital audio; image data; and contextual literary data.

In still yet another aspect of the invention there is provided a digital audio file embedded with a multi-dimensional property vector comprising a plurality of assembled property vector components each relating to a musical property derived from a plurality of sets of quantized representations of signal qualities of the digital audio file.

The embedded multi-dimensional vector is a vector correlated to musical properties defined by measurable signal qualities indicative of rhythm, tonality, timbre and musical texture.

Each of the assembled vector components ($OR_x$, $OTO_x$, $OTI_x$ and $OTX_x$) reflect a measure in vector dissimilarity space for the musical property assessed relative to reference vectors in semantic distance separation space.

There is also provided a digital image file embedded with a multi-dimensional property vector comprising a plurality of assembled property vector components each relating to a visual property derived from a plurality of sets of quantized representations of signal qualities of the digital image file.

Rather than being directed embedded, the multi-dimensional property vector (either for the audio or image/video file) may be linked to or cross-referenced to a unique identify, such as a file name or international track identification number, for the digital audio file.

In another aspect, there is provided a database containing a multiplicity of digital audio files of any of claims 41 to 43 or a multiplicity of digital image file of claim 44.

Fundamentally, the approach differs from current data science approaches that have their approaches rooted back to hard and/or absolute data values. Rather, the present invention weights output results from a neural network tasked with evaluating, in a vector space, dissimilarity of extracted measurable properties of pairwise-contrasted source files back towards human perception of similarity/dissimilarity as expressed in semantic space between the same pairwise-contrasted source files. This semantic space is a different vector space in which subjective descriptive context is mapped into measurable vectors representative of the context but now expressed in manipulative mathematical form. In other words, the embedding process is designed such that subjective descriptions which are semantically similar are viewed in the resulting vectoral (semantic) space as correspondingly similar.

Advantageously, the present invention provides an innovative methodology for data categorization and, more particularly, a system and method that permits rapid assimilation of user-perceivable qualities between original data and possible relevant search data, e.g. detection of audio or sections of an audio file that are likely to warrant a listener's interest.

A preferred embodiment, amongst other things, provides a track finder or track recommendation tool that is able to consistently characterize a sampled piece of music by distilling out identifiable musical properties in a section thereof, and then to identify other pieces of music that commonly share those musical characteristics and/or subjective musicological traits.

Given the number of accessible musical files, including remixes of tracks that can subtly or significantly change the original piece of music, within musical libraries (whether personal ones containing hundreds or a few thousand audio tracks or commercial libraries having millions of tracks for commercial streaming or download) the present invention provides a useful and effective recommendation tool that hones search results for tracks based on ranking of perceived musicological similarities and is thus able to disregard arbitrary genre categorization and rather to focus on perceptive audio qualities/similarities.

The track finding tool of the various embodiments therefore beneficially reduces the need for extensive listening to tracks by a listener in order to identify music that is consistent with the user's particular and subjective tastes, i.e. the track finding tool reduces the search space by identifying user-orientated perceptually relevant tracks. Moreover, through objective and technically qualified assessment of musicology, the embodiments of the invention provide increased and more rapid access to a greater range of music that is stored or accessible through musical libraries, especially subscriber-accessible on-line libraries or server stores, thereby lending itself to improving both end-user selection and end-user access to music through qualified recommendation. The embodiments of the invention can therefore mitigate the issues of cold start by promoting new audio tracks and artists to a more selective and likely more receptive listening base based on perceptually similar musical properties.

The same principles apply to the identification of other contextually describable subjective works that act as a source for computer-implemented data analysis, including images, text and/or video.

Various aspects and embodiments of the invention as outlined in the appended claims and the following description can be implemented as a hardware solution and/or as software, including downloadable code or a web-based app.

BRIEF DESCRIPTION OF THE DRAWINGS

Exemplary embodiments of the present invention will now be described with reference to the accompanying drawings in which.

DETAILED DESCRIPTION OF A PREFERRED EMBODIMENT

Figure 1:
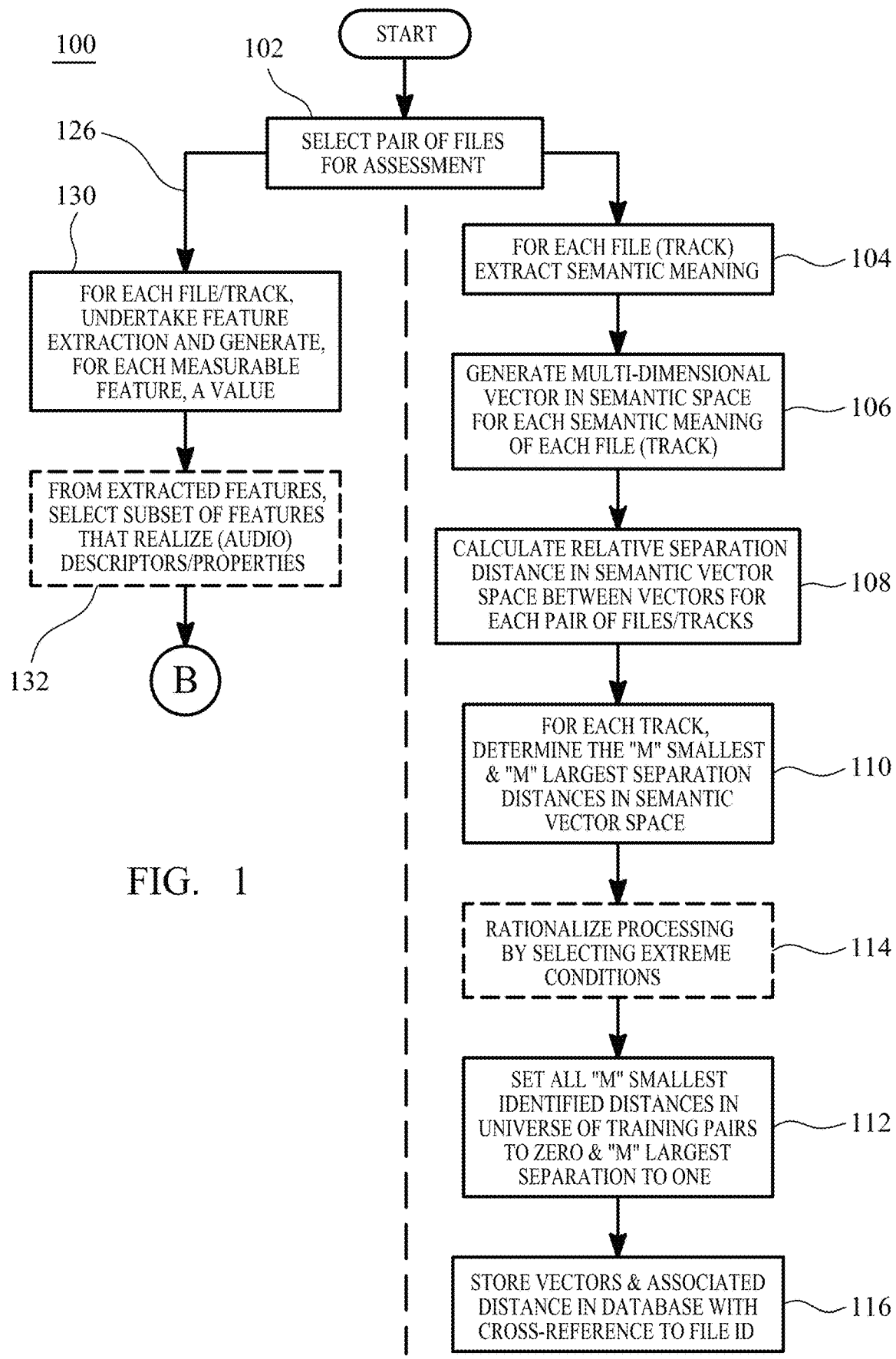
FIG. 1 represents a flow diagram of a preferred process to assess dissimilarity of files and, particularly, audio files, and a process by which an artificial neural network may be trained according to the present invention.

In order to provide a tool, such as accessed through a web-browser or local app, that evaluates semantic similarities or dissimilarities between (for example) audio tracks, it has been recognised that it is necessary to make use of deep-learning and artificial intelligence to identify similarities between semantic meaning, processed to provide a first metric in semantic space, and extracted measurable properties for content of the same data source in a different measurable space, such as Euclidean space (although other dimensional spaces may be used). This process effectively provides a translational mapping between the similarities in semantic meaning in one space and similarities in extracted measurable properties in another space.

More particularly, it has been recognized that a measure of emotionally-perceptive similarity or dissimilarity (especially in the exemplary sense of a digital audio file, image file or other perceptive aesthetic creation in digital form) cannot be derived from hard data fields alone, e.g. quantized representations of signal quality, since such hard data does not provide for any interpretation that is experienced by a human-reviewer, e.g. a listener. In other words, feature extraction in isolation does not give a sufficiently accurate objective assessment of emotionally-perceived similarity or dissimilarity because quantized representations (whether in isolation or grouped) of signal qualities do not provide any relationship into the emotive real-world.

The present invention therefore functions, initially, in the context of one or more trained artificial neural networks ANNs that [relative to deficient earlier entirely de-coupled and objectively assessed approaches] are functionally arranged to map, i.e. associate or couple, subjectively-derived content descriptions expressed in semantic space to measurable properties extracted for the same pair of contrasted files as expressed in Euclidean space, thereby correcting for the de-coupling that currently exists between feature extraction and human intuition and/or human emotive perception of similarity or dissimilarity in, particularly, subjectively-evaluated/perceived data, e.g. music.

The effect of the neural network functions is to create two independent vectors that both purport to represent emotionally-perceivable or documented dissimilarities in digital audio and/or image data and/or literally work, but in different vector spaces. The first vector in semantic space is based on the human descriptions of source files and thus carries significantly higher contextual weight. The first vector is therefore used to assess and correct the second vector in, for example, Euclidean space, thereby allowing convergence—through changing of weights in the ANN—of the output of a different neural network to the semantic result of the first neural network. The Euclidean vector is also derived from selected subjective properties extracted from the original source data, e.g. pairwise comparison of songs, during deep-learning in artificial neural networks.

Following training, the convergence process provides, ultimately, a transformative function in the ANN that permits any data file to be assessed relative to other pre-assessed data files to assess similarity in semantic and emotionally-perceivable content.

As such, at least during a training phase for an artificial neural network, two independent vectors are generated for a common source. The first vector is semantically based and derived from (typically) associated metadata for the source data/file and the second vector is extracted from the main content (e.g. payload) of the source/data file. Whilst these two vectors—the first based on human judgment and the second extracted from hard, identifiable and absolute measurable properties—should be identical, they may not be. Consequently, to produce a truly representative predictive tool that assesses emotional/perceptive dissimilarity or closeness, it is necessary that processing of the absolute measurable properties eventually leads to an identical result to processing of the human judgment, i.e. semantic, qualities. In order to reflect true emotive perception, the assessment relating to human judgment is of higher importance and trumps the absolute evaluation of identifiable and measurable tangible properties that are both obtained from the common source. Forcing a change in applied weights and bias values in an artificial neural network that processes the identifiable and measurable tangible properties obtains closer alignment with reality, as reflected by human intelligence, judgment and perceptive reasoning.

1. Similarity/Dissimilarity Assessment of Contextual Explanation in Semantic Space An initial semantic description of the nature of the file, e.g. a contextual written description including context in a sentence and the use of particular words, is firstly converted or "embedded" into a multi-dimensional semantic vector using, for example, natural language processing "NLP" techniques and the like. The contextual written description amounts to a metric of human judgement which is subjective, perceptive and/or emotionally-based.

NLP, as supported by (for example) the Universal Sentence Encoder from Google and particularly the Tensorflow™-hub, encodes text into high dimensional vectors that can be used for text classification, semantic similarity, clustering and other natural language processing tasks. In practical terms, NLP processing of two semantically similar descriptions will yield vector representations that are similar.

Whilst there may be some diversity in textual descriptions from different annotators, these are not considered statistically significant given the nature of the processing that is undertaken.

The choice of the commuting process between text and a vectorial representation is a design option, e.g. processing using Tensorflow™ may be based on training with a Transformer encoder or alternatively a Deep Averaging Network (DAN). The associated vector, in semantic space, is technically important from the perspective of overall training.

The semantic vectorization process is applicable to other forms of media data, such as image data in the form of a painting or film, that has semantic properties and corresponding aesthetic descriptors that can be converted in the numerical representation.

During the training sequence, an NLP-derived multi-dimensional vector is compared, on a pairwise basis, with other NLP-derived vectors to identify, in semantic vector space, a separation distance representation of pairwise semantic closeness. This firstly establishes a user-centric perception of pairwise closeness. In this sense, it will be appreciated that use of the terms "semantic" and "semantic space", etc., reflect that the origin of any corresponding vector or value stems from a subjectively-prepared description of human perceptual or emotive (i.e. semantic) qualities of the content of a file, e.g. audio track.

The preferred use of NPL provides an initial mapping between textual descriptors and a vector value in semantic space. The same principle could be applied to categorization of other media, e.g. video, films, paintings, fashion in the exemplary sense of clothing and decoration (with properties being in terms of colours and patterns and texture for coverings and the like) as well as medical records that may include images.

To provide a context in terms of musicology, taking Rimsky-Korsakov's "Flight Of The Bumblebee" as a first audio training track, this audio track may be described in two word dimensions as "frenetic" and "light" with NLP ascribing a vector representation of 1004512112 for tracks containing only these two NLP-resolved terms. Of course, the number of linguistic dimensions can be more than two and so the audio track's description could be expanded to include other semantic associations arising, for example, with (i) temporal events, such as dusk, Easter, cloudy, etc., and/or (ii) feelings, and/or (iii) themes, e.g. fairy-tale or fact and/or (iv) environments.

The vector "1004512112" is merely provided as an arbitrary example and, in fact, the generated multi-dimensional vector may take an entirely different form, especially since the number of word/sentence dimensions is only limited by the semantic associations that can be derived from the descriptive sentence for the audio track.

The process is repeated for a high number of independent samples, e.g. typically many thousands and preferably at least about ten thousand or more, to assemble a multi-dimensional matrix for the audio track-finding application which is used to provide a contextual example. Therefore, semantic similarity/dissimilarity is established between all training tracks, such as the aforementioned Flight Of The Bumblebee and, say, the electronic song "White Flag" by DELTA HEAVY™ or "Boulevard of Broken Dreams" as performed by GREEN DAY™. The size of the training set is, however, a design option driven by processing capacity, time and a desired level of achievable confidence/accuracy. Rather than to assess all pairs, an option is to select extreme variations in pairwise distance measures to train the ANN.

A resultant semantic first vector will be assembled from, in a preferred embodiment, at least a multiple of 64 individual dimensional components (although the precise number is reflective of implementation choice and desired accuracy). When using the Tensorflow™ universal sentence encoder, the processing of the semantic description yields a vector (in semantic space) of five hundred and twelve dimensions. Consequently, the precise semantic vector length is a design option and may vary.

It does not matter whether the semantic vector and the property vector (described in more detail below) are of the same size since the system considers dissimilarity as assessed on a pairwise basis.

2. Distance Assessment based on Extracted Properties

In generating the second independent vector in a second training process based on derived "properties" (as contrasted with semantic descriptions of the file used for pairwise semantic closeness outlined immediately above and described in detail in section 3 below), the weighting factors applied to nodes in layers of the neural network are changed by backpropagation to converge the results in (typically Euclidean) property distance space towards those of the semantic (typically Euclidean) separation distances (in semantic space) and therefore intrinsically back to the original semantic description(s).

As indicated earlier, the vector space for the first and second vectors is different in the sense that, although from a common source and one file, the input qualities of the input data that is to be processed are different. Processing of subjective description material by NLP can therefore be considered to yield the first vector in semantic space (or semantic distance space), whereas processing of absolute values relating to identified properties (even is these properties can be expressed in different selectable numeric terms for signal properties) yields, as an output of the ANN, a second vector in "property space".

In a preferred embodiment, Euclidean space is used as opposed to readily appreciated alternatives, i.e. non-Euclidean geometries.

An artificial neural network functions to convert measurable properties of a source file into a manipulable vectorial representation thereof. This conversion produces a second independently-generated vector, i.e. the second vector. This conversion can be considered as "feature extraction". In a preferred embodiment (in the exemplary case of audio processing), feature extraction is achieved using Essentia™ app developed by the Music Technology Group at Pomepu Fabra University (see https://essentia.upf.edu/documentation/streaming_extractor_msuic.html).

Essentia™ (or its functional equivalent) is an existing library providing a foundation for the analysis of a source audio file to identify a multiplicity of audio descriptors, such as band energies, band histograms and other measurable music qualities of the source track. In Essentia™, these audio descriptors number up to one hundred and twenty-seven. The audio descriptors can each be considered to be a quantized representation of a measurable parameter of the audio signal.

Returning to the exemplary context of an audio file, the processing intelligence behind Essentia™—in a like manner to equivalent categorization mechanisms—provides for feature extraction from the source file. Selection of appropriate ones of the audio descriptors in a subset define broader musical aspect or quality of each audio track, e.g. a first subset of measured quantized representations [nominally] from audio descriptor bins 1, 15, 32, 33 and 108 (from the possible total universal set of 127 audio descriptors in Essentia) might be combined by the programmer to define "rhythm", whereas a subset of measured quantized representations from audio descriptors 5-21, 43, 45, 50, 71-77 and 123-127 could define "timbre" and a third different subset tonality, i.e. tonal quality of the performance. The subsets therefore provide further semantic properties in the musicology of the sampled source audio track.

For other forms of source file, such as video or image files, alternative measurable parameters are parsed from the source file to define alternative usable qualities.

As indicated, in the context of audio and particularly audio properties, a piece of music can be described using timbre, rhythm, tonality and texture. The properties of timbre, rhythm and tonality are particularly important.

3. Measurable Musical Properties

In this respect, it will be appreciated that:

"TEXTURE" is generally reflected by two-dimensional patterns in the time-frequency space which relate to the temporal evolution of the spectral content. Texture is therefore seen in a mel-spectrograph or mel-spectrum that plots the frequency domain against the time domain. Within such a mel-spectrum, evolving texture can be learnt by a neural network (as described subsequently) by identifying patterns that evolve with time, such as for example (i) interrupted horizontal spectral lines in high/mid-range frequencies, (ii) parallel vertical spectral lines stretching the mid and high-frequency range, and (iii) ascending or descending steps in the low-mid frequency range. Texture therefore provides a further complementary semantic property that is useable, in the context of the present invention, to assess track similarity/dissimilarity through provision of a further measurable metric in property space.

"RHYTHM" can be considered as the arrangement of notes according to their relative duration and relative accentuation (see https://www.naxos.com/education/glossary.asp?char=P-R#). As will be appreciated, rhythm can be expressed in terms such as (but not limited to):
  i) beats loudness as computed from beats and musical spectrogram with aggregations reflecting mean and variance (see https://essentia.upf.edu/documentation/reference/std_BeatsLoudnesshtml and https://essentia.upf.edu/documentation/reference/std_BeatTracker-MultiFeature.html);
  ii) beats per minute "BPM" (see https://see essentia.upf.edu/documentation/reference/stdBpmHistogramDescriptors.html and https://essentia.upf.edu/documentation/reference/std_BeatTrackerMultiFeature.html);
  iii) BPM histogram as computed from the signal with aggregations reflecting first and second peak heights and spread (see https://essentia.upf.edu/documentation/reference/std_BpmHistogramDescriptors.html, and https://essentia.upf.edu/documentation/reference/std_BeatTrackerMultiFeature.html);
  iv) danceability (see https://essentia.upf.edu/documentation/reference/std_Danceability.html);
  v) onset rate (see https://essentia.upf.edu/documentation/reference/std_OnsetRate.html); and
  vi) band-wise beats loudness as computed from beats and musical spectrogram as reflected by mean values and variance over six bands (see https://essentia.upf.edu/documentation/reference/std_BeatsLoudness.html and https://essentia.upf.edu/documentation/reference/std_BeatTrackerMultiFeature.html).

Whilst the property of rhythm is, in Essentia terms, suggested as a collection of six measurable attributes, it will be appreciated that, in fact, more than six measurable attributes can contribute to this property, as reflected (for example) by the references to mean and variance values of specific musicological attributes. It will be understood by the skilled addressee that the multi-dimensional vector that is compiled for the property rhythm may therefore vary from the suggested Essentia parameters and be formed from other measurable attributes that provide a musicologically workable definition of rhythm. In a preferred embodiment, nominally nineteen (19) measurable attributes are assigned to the concept of rhythm, although other numbers of attributes can be used.

"TONALITY" is the arrangement of pitches and/or chords of a musical work in a hierarchy of perceived relations, stabilities, attractions and directionality. In this hierarchy, the single pitch or triadic chord with the greatest stability is called the tonic. Tonality is therefore an organized system of tones (e.g., the tones of a major or minor scale) in which one tone (the tonic) becomes the central point for the remaining tones and where the remaining tones can be defined in terms of their relationship to the tonic. Harmony is a perceptual tonal quality.

As will be appreciated, tonality can be expressed in terms such as (but not limited to):
  i) chords change rates as computed from Harmonic Pitch Class Profiles (HPCP) of the spectrum (see https://essentia.upf.edu/documentation/reference/std_ChordsDeseriptors.html
  ii) chords number rate as computed from HPCP (see https://essentia.upf.edu/documentation/reference/std_ChordsDescriptors.html);
  iii) chords strength as computed from HPCP with aggregations reflecting mean and variance (see https://essentia.upf.edu/documentation/reference/stdChordsDescriptors.html);
  iv) HCPC entropy as computed from HPCP with aggregations reflecting mean and variance (see https://essentia.upf.edu/documentation/reference/std_HPCP.html, and https://essentia.upf.edu/documentation/reference/std_Entropy.html;
  v) key strength as computed from HPCP (see https://essentiua.upf.edu/documentation/reference/std_KeyExtractor.html);
  vi) tuning diatonic strength as computed from HPCP (see https://essentia.upf.edu/documentation/reference/std_TuningFrequency.html)
  vii) tuning equal tempered deviation as computed from HPCP (see https://essentia.upf.edu/documentation/reference/std_TuningFrequency.html)
  viii) tuning non-tempered energy ratio as computed from HPCP (see https://essentia.upf.edu/documentation/reference/std_TuningFrequency.html); and
  ix) chords histogram as computed from HPCP (see https://essentia.upf.edu/documentation/reference/std_ChordsDescriptors.html).

Whilst the property of tonality is, in Essentia's term, suggested as a collection of ten measurable attributes, it will be appreciated that, in fact, more than ten measurable attributes can contribute to this property, as reflected by the references to mean and variance values of specific musicological attributes. It will be understood by the skilled addressee that the multi-dimensional vector that is compiled for the property tonality may therefore vary from the suggested Essentia parameters and be formed from other measurable attributes that provide a musicologically workable definition of tonality. In a preferred embodiment, nominally thirty-three (33) measurable attributes are assigned to the concept of tonality, although other numbers of attributes can be used, with these obtained from an application of greater or lesser granularity of quantized measurement. For example, the "chords histogram" is implemented as a twenty-three-dimensional vector.

In terms of Essentia's treatment of another measurable attribute "chords strength", this is computed through parsing the audio file with a moving window (frame) and, from each window (frame), extracting a value to yield a sequence of numbers (on a one number per frame basis). The sequence is, in turn, used to compute its mean and variance. Therefore, in a preferred embodiment, the measurement "chords strength" is rationalized to just two numbers, i.e., the mean and variance of the aforementioned sequence. This example shows how measurement values that are used in assessment of an identified property can depart from the recommendations made in Essentia, albeit that the multi-dimensional vector that is produced to reflect the property, e.g. rhythm or tonality, contains sufficient spectral information to provide a user-acceptable definition of the property.

"TIMBRE" is a relatively esoteric measure and manifests itself in the complexity of the sound which can in turn be measured via the spectrogram of the sound. Timbre is the perceived sound quality of a musical note, sound or tone. Timbre distinguishes different types of sound production, such as choir voices and musical instruments, such as string instruments, wind instruments, and percussion instruments. It also enables listeners to distinguish different instruments in the same category (e.g. an oboe and a clarinet, both woodwind instruments). Physical characteristics of sound that represent the perception of timbre include the sound spectrum and the signal envelope, with timbre permitting an ability to resolve sounds even in stances when the sounds have the same pitch and loudness.

As will be appreciated, timbre can be expressed in terms such as (but not limited to):

i) barkbands_crest as computed from the barkband-filtered spectrogram with aggregations over mean and variance for identified Bark frequency ranges (see https://essentia.upf.edu/documentation/reference/streaming_Crest.html and https://en.wikipedia.org/wiki/Bark_scale#Bark_scale_critical_bands);

ii) barkbands_flatness_db as computed from the barkband-filtered spectrogram with aggregations over mean and variance for identified Bark frequency ranges (see https://essentia.upf.edu/documentation/reference/std_FlatnessDB.html);

iii) barkband_kurtosis as computed from the barkband-filtered spectrogram with aggregations over the mean for identified Bark frequency ranges (see https://essentia.upf.edu/documentation/reference/std_DistributionShape.html);

iv) barkband_skewness as computed from the barkband-filtered spectrogram with aggregations over mean and variance for identified Bark frequency ranges (see https://essentia.upf.edu/documentation/reference/std_DistributionShape.html);

v) barkband_spread as computed from the barkband-filtered spectrogram with aggregations over the mean for identified Bark frequency ranges (see spectral complexity as computed from the audio signal's spectrogram with aggregations reflecting mean and variance (see https://essenda.upf.edu/documentation/reference/std_DistributionShape.html);

vi) spectral dissonance as computed from the audio signal's spectrogram with aggregations reflecting mean and variance (see https://essentia.upf.edu/documentation/reference/std_Dissonance.html);

vii) dynamic_complexity as computed from the audio signal's RMS envelope (see https://essentia.upf.edu/documentation/reference/std_DynamicComplexity.html);

viii) high frequency content as computed from the audio signal's spectrogram with aggregation over the mean (see https://essentia.upf.edu/documentation/reference/std_HFC.html);

ix) pitch salience as computed from the audio signal's spectrogram with aggregations reflecting mean and variance (see https://essentia.upf.edu/documentation/reference/std_PitchSalience.html);

x) spectral complexity as computed from the audio signal's spectrogram with aggregations reflecting mean and variance (see https://essentia.upf.edu/documentation/reference/std_SpectralComplexity.html);

xi) spectral energy high frequencies as computed from the audio signal's spectrogram with aggregations reflecting mean and variance (see https://essentia.upf.edu/documentation/reference/std_EnergyBand.html);

xii) spectral energy low frequencies as computed from the audio signal's spectrogram with aggregations reflecting mean and variance (see https://essentia.upf.edu/documentation/reference/std_EnergyBand.html);

xiii) spectral energy mid-high frequencies as computed from the audio signal's spectrogram with aggregations reflecting mean and variance (see https://essentia.upf.edu/documentation/reference/std_EnergyBand.html);

xiv) spectral energy mid-low frequencies as computed from the audio signal's spectrogram with aggregations reflecting mean and variance (see https://essentia.upf.edu/documentation/reference/std_EnergyBand.html);

xv) spectral entropy as computed from the audio signal's spectrogram with aggregations reflecting mean and variance (see https://essentia.upf.edu/documentation/reference/std_Entropy.html);

xvi) spectral flux as computed from the audio signal's spectrogram with aggregations reflecting mean and variance (see https://essentia.upf.edu/documentation/reference/streaming_Flux.html);

xvii) spectral kurtosis as computed from the audio signal's spectrogram with aggregation over the mean value (see https://essentia.upf.edu/documentation/reference/std_DistributionShapehtml);

xviii) spectral strong peak as computed from the audio signal's spectrogram with aggregations reflecting mean and variance (see https://essentia.upf.edu/documentation/reference/std_StrongPeak.html);

xix) zero crossing rate as computed from the audio signal and with aggregations over mean and variance (see https://essentia.upf.edu/documentation/reference/std_ZeroCrossingRate.html);

xx) MFCCs as computed from the audio signal's spectrogram with aggregation over the mean (see https://essentia.upf.edu/documentation/reference/std_MFCC.html); and xxi) spectral contrast as computed from the audio signal and with aggregations over mean and variance of both peaks and valleys (see https://essentia.upf.edu/documentation/reference/std_SpectralContrast.html).

Whilst the property of timbre is, in Essentia's term, suggested as a collection of twenty-one (21) measurable attributes, it will be appreciated that, in fact, more than twenty-one measurable attributes can contribute to this property, as reflected by the references to mean and variance values of specific musicological attributes. It will be understood by the skilled addressee that the multi-dimensional vector that is compiled for the property timbre may therefore vary from the suggested Essentia parameters and be formed from other measurable attributes that provide a musicologically workable definition of timbre. In a preferred embodiment, nominally seventy-five (75) measurable attributes are assigned to the concept of timbre, although other numbers of attributes can be used, with these obtained from an application of greater granularity in measurement, as indicated above and as will be understood by a musicologist.

In the context of audio track assessment and track-finding, the properties of tonality, rhythm and timbre importantly provide a basis by which measurement of subjective qualities of a source file can be assessed objectively. These properties may be derived from Essentia attributes, as identified above, or a subset of those Essentia™ signal attributes or from an equivalent library identifying suitable audio descriptors. Indeed, as will be appreciated, the present invention selects nineteen, thirty-three and seventy-five quantised representations for the properties of rhythm, tonality and timbre, with some of these overlapping with the Esssentia™ tool-box whereas other are variants or different signal measures. Consequently, the number of quantized representations is not fixed, but rather variable according to the musicologist belief concerning what signal attributes are required to define the particular properties that are being assessed.

Given the above, it is a design option as to how a skilled person selects—or indeed which —measurable attributes to define a suitable property for use in an assimilation process. The property of rhythm, for example, may be reviewed to include or exclude certain of the Essentia measurements, so in some respects it is understood that whilst the assessed properties are technical in nature and are measurable by existing technical processes, the lack of a consistent definition of what amounts to a "property" is unsurprising but not technically relevant. Rather, properties of the content of the file are to a degree both esoteric and subjective. However, it is the mapping of definitive yet subjectively assembled measurables in property space into an independent yet entirely relevant and corresponding semantic assessment in semantic space which is important.

4. Artificial Neural Network (ANN)

In accordance with concepts of the various aspects and embodiments of the present invention, pairwise similarity/dissimilarity in property space is mapped back to initial semantic similarity/dissimilarity (e.g. expressive and subjective linguistic descriptors) in semantic space. This is a multi-stage process that may involve multiple neural networks running in parallel. The use of multiple parallel ANNs permits control of musical modality, whereas use of a single ANN is possible. Aspects of the invention are concerned with training of the neural network that processes the extracted properties and evaluates dissimilarity in the property space.

FIG. 1 represents a flow diagram of a preferred process 100 to assess dissimilarity of files (and particularly audio files) and a process by which an artificial neural network may be trained according to the present invention. FIG. 1 therefore corresponds to and expands upon the process described above in relation to section "1: Similarity/Dissimilarity Assessment of Contextual Explanation in Semantic Space".

Audio files are used as an example of the underlying process since audio files, especially music files, can be subjectively interpreted from applied individual human perception.

As a training set of many hundreds (and preferably many thousands) of source files, pairs of files are selected 102 and semantically contrasted through ANN assessment. In a first path, using NLP, an artificial neural network extracts 104, i.e. processes to generate/embed, a representative vector for the semantic meaning conveyed in associated textual metadata (or as an accompanying description) for each file, e.g. each audio track of the pair. This results in, typically, the production 106 of a five hundred and twelve (512) dimensional vector from Tensorflow™ (or the like) that expresses the derived semantic meaning as a manipulatable value that can be evaluated.

The ANN can therefore effectively tabulate vectorial separation distances between all N files in the training set, where N is typically more than five hundred files and generally considerably more than several thousand. The more samples in the training sequence, the greater the granularity and associated confidence, albeit that higher numbers of samples increases processing complexity. In short, the more samples the better. However, as an option to train the ANN, the process may make a sub-selection of pairs where distance separations indicate that they are either very similar or very dissimilar, i.e. training may be based on extreme conditions.

At this point, tabulation of relative distance separation is abstract in that, whilst absolute distances exist in terms of separation distance values (e.g. five measurement units, fifty-seven measurement units or 1013 units), they do not reflect a scaled value of similarity/semantic closeness in multi-dimensional space. Assuming that N is sufficiently large, it has been recognised that for each file (track) there exists at least a reasonably certain number m of those N files (where is a positive integer and m<<N) will be similar or dissimilar.

In a preferred embodiment, for each source file in the training set, e.g. song "A", an arbitrary number, say ten, closest vectors in semantic distance vector space are selected; this forms a group or cluster of closely semantically-related songs. Statistically, in a training set of several thousand or perhaps a few tens of thousands of source files, clustering together [as equivalent] 0.1% of the universe is statistically acceptable in terms of likely semantic closeness. Indeed, relative to the universe of songs in a reasonable training sequence, closeness may be viewed to be in the range of between about 0.05% and about 1%, although with increasing percentage values the likely user-perception of audio dissimilarity will increase.

For a song "A", the system intelligence is arranged to consider the "m" (e.g. the ten and where m≥1) nearest songs as semantically similar in the sense of being user-perceptually close. This is reflected by setting—and then recording in a data record—a distance between these m songs around the vector for song "A" to be zero. For all songs outside the m closest, the system intelligence is arranged to consider these songs as dissimilar, i.e. that these other (not m) songs as semantically dissimilar in the sense of being user-perceptually far apart. Consequently, dissimilar songs are identified, relative to song "A", as having a distance of one. Therefore, for each assessed audio track, 2*m pairs of records are created and stored by the system as a retrievable and accessible record. Selection of an equal value of m ensures that training of the neural network is not biased by one extreme of the other (in terms of similarity or dissimilarity).

The processing burden on the ANN can, in most cases, be rationalised 114 at some point in the training process, as will be understood. Specifically, optimized training of an ANN is achieved through training with extreme cases, rather than with a bulk of similar values. Consequently, for any pairwise association, taking farthest apart and closest separation distances reduces time to hone the applied weights applied to neurons in the ANN.

A first semantic reference in the form of a "first vector", as outlined above in section 1: Similarity/Dissimilarity Assessment of Contextual Explanation in Semantic Space is thereby established as a reference for ANN training.

Returning to the original source files (e.g. audio tracks), a second path 126 for evaluation and assessment again looks, on a pairwise basis, for indicative patterns across the entire training space of N files (e.g. N audio tracks). Particularly, as indicated above in section 2: Distance Assessment based on Extracted Properties, the process undertakes feature extraction 130 of signal attributes by parsing the source (audio) file pairs to produces bins of quantized representations of signal qualities, such as explained above in section 3: Semantic Properties [in the specific exemplary context of audio/music]. Individual bins of quantized representations of signal qualities are then appropriately identified and selectively group together 132 to define semantic/subjective musicological properties, i.e. rhythm, tonality, timbre and texture, that can be evaluated and manipulated in more absolute terms in property space.

Figure 2:
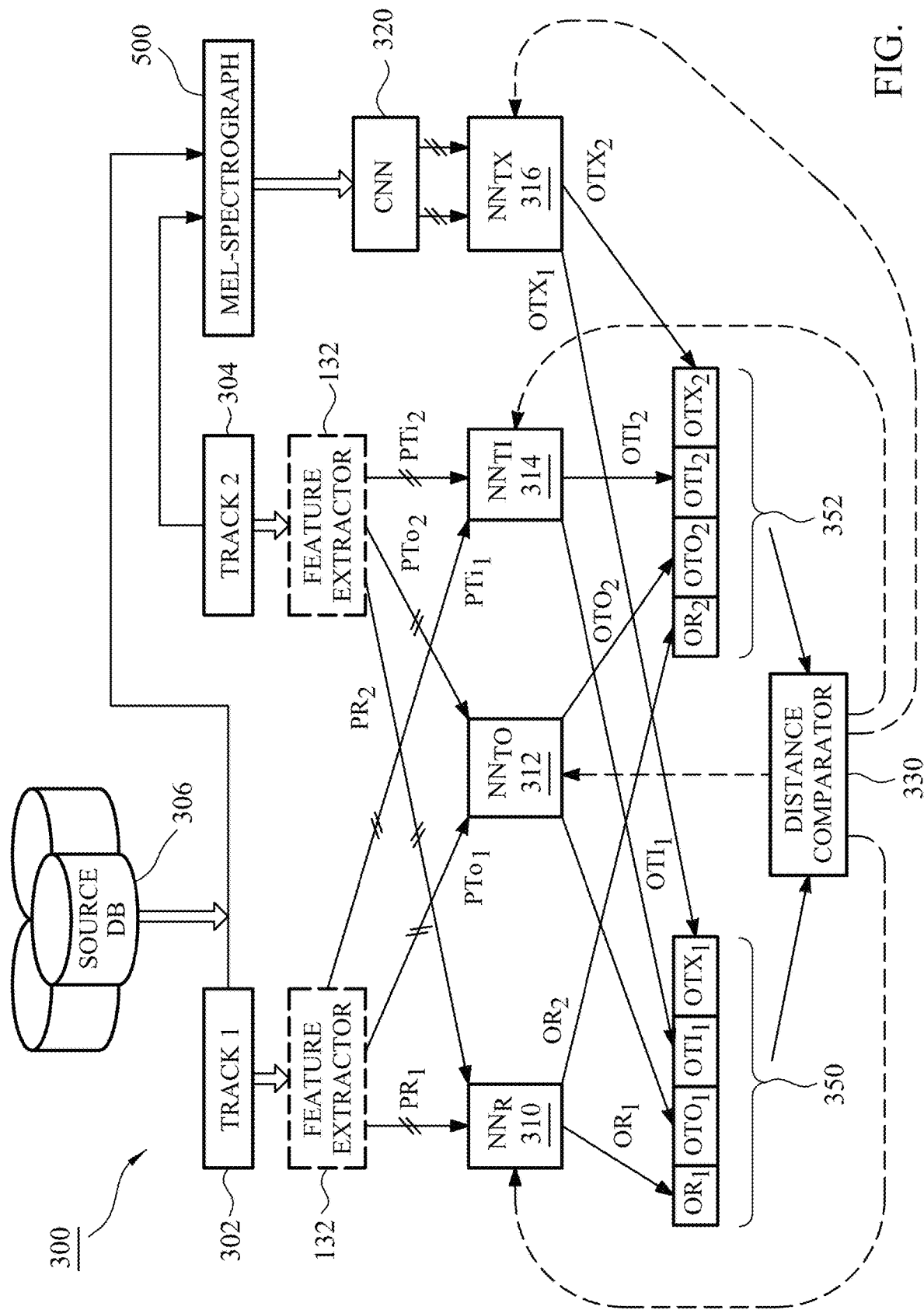
FIG. 2 is a schematic representation of a system architecture for training an artificial neural network according to a preferred embodiment.
Figure 3:
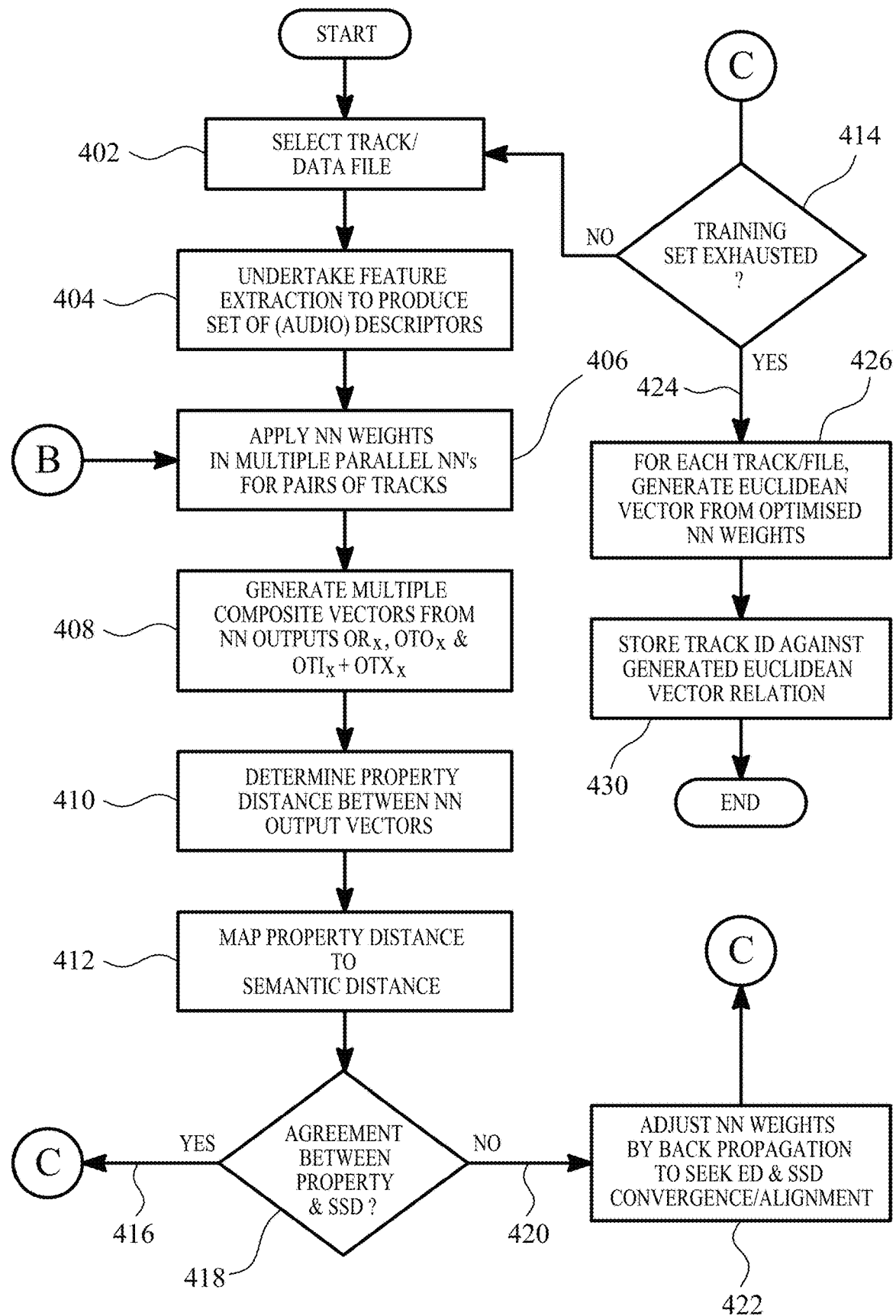
FIG. 3 is a flow diagram relating to a preferred process of training the neural network of FIG. 2 to assimilate semantic vector space with property vector space to identify property similarities and property dissimilarities between source files.

Reference is made to FIG. 2 and the process of FIG. 3.

FIG. 2 is a schematic representation of a system architecture for training a system including artificial neural networks according to a preferred embodiment. FIG. 3 is a flow diagram relating to a preferred process of training the neural network of FIG. 2 to assimilate semantic vector space with property vector space to identify property similarities and property dissimilarities between source files.

On a pairwise basis, two files (e.g. digital audio files 302, 304) of the N files are selected from a training database 306 of files and are subjective to assessment and interpretation by the system 300. The system 300 may be embodied within a more general system intelligence, such as supported by a server or a distributed system of interactive processors and includes a plurality of artificial neural networks.

As indicated above, initial processing of each selected audio file in a feature extractor 301 (such as Essentia or its functional equivalent whether this be in the context of the exemplary case of audio file processing or for a different format of source file, such as a picture) produces bins of quantized representations of signal qualities, with these bins selectably grouped to define a plurality respective outputs representing different semantic properties P, e.g. timbre "PTi", tonality "PTo" and rhythm PR, in numeric terms. Value representations for each of these subjective properties for each audio track (e.g. $PTo_2$ for the property of tonality extracted from track 2) are applied commonly as inputs to dedicated parallel neural networks for weight optimization in the evaluation process for each property.

In the exemplary context of an audio file and track finding system, there are independent ANNs for rhythm "$NN_R$" 310, tonality $NN_{TO}$ 312, timbre $NN_{TI}$ 314 and musical texture $NN_{TX}$ 318.

Musical texture is a special case and requires a different process flow. Musical texture is discussed below in more detail.

For processing and evaluation of other training data, such as images, there may be more or fewer parallel ANN chains. The ANN chains, shown to number four in FIG. 2, can be considered as independent processing paths, branches or pathways and thus sub-networks of the network. The number relates only to the number of semantically discernible properties. The system may, in fact, operate with just a single chain that processes data in multiple passes to arrive at a composite result suitable for evaluation.

The ANN for rhythm "$NN_R$" 310 thus receives an input representation only of the property rhythm, with this being assembled (in a preferred embodiment) from a vector of nineteen components, i.e. nineteen extracted signal attributes. The ANN for tonality "$NN_{TO}$" 312 thus receives an input representation only of the property tonality, with this being assembled (in a preferred embodiment) from a vector of thirty-three components, i.e. thirty-three extracted signal attributes. The ANN for timbre "$NN_{TI}$" 314 thus receives an input representation only of the property tonality, with this being assembled (in a preferred embodiment) from a vector of seventy-five components, i.e. seventy-five extracted signal attributes.

As indicated above, the definition of each property can vary in terms of the number and/or attribute nature of the extracted signal representation for each bin. Therefore, in the express context of audio files and the use of Essentia, all of the available attribute signal bins (including, for example, barkbands_flatness_db and dynamic_complexity for timbre) may be used, some may be used or others not mentioned above may be used in place of or otherwise extent the number. The definition of a "property" is therefore subjective (to some extent), although this subjectivity is irrelevant if a consistent approach to a property's definition is adopted. In other words, the programmer is able to determine how to define a subjective property by identifying and selecting desired measurements for signal attributes.

The ANNs for rhythm "$NN_R$" 310, tonality $NN_{TO}$ 312, timbre $NN_{TI}$ 314 and musical texture $NN_{TX}$ 318 therefore determine and refine weight values that account for differences in these properties, with weights and biases refined by an iterative process involving the entirely of the training set and a backpropagation algorithm tasked to find the appropriate adjustments for each trainable parameter. The process of backpropagation is understood by the skilled addressee so it is relevant to point to the intent of what is to be aligned and the objectives and benefits achieved by the architecture and process as described herein.

It has been recognized that the issue of musical texture also has a part to play in the assimilation of content property metrics (derived from vectorial representations of measurable properties of each track in pairwise comparison) to semantic metrics (derived from vectorial representations of sematic descriptions of each track in pairwise comparison).

The approach adopted by the embodiments of the present invention therefore emphasises the importance of human emotional perception over strict machine-learning, thereby weighting operation of an ANN towards human-perception rather than statistical mapping based on interpretation of absolute numeric data.

Figure 4:
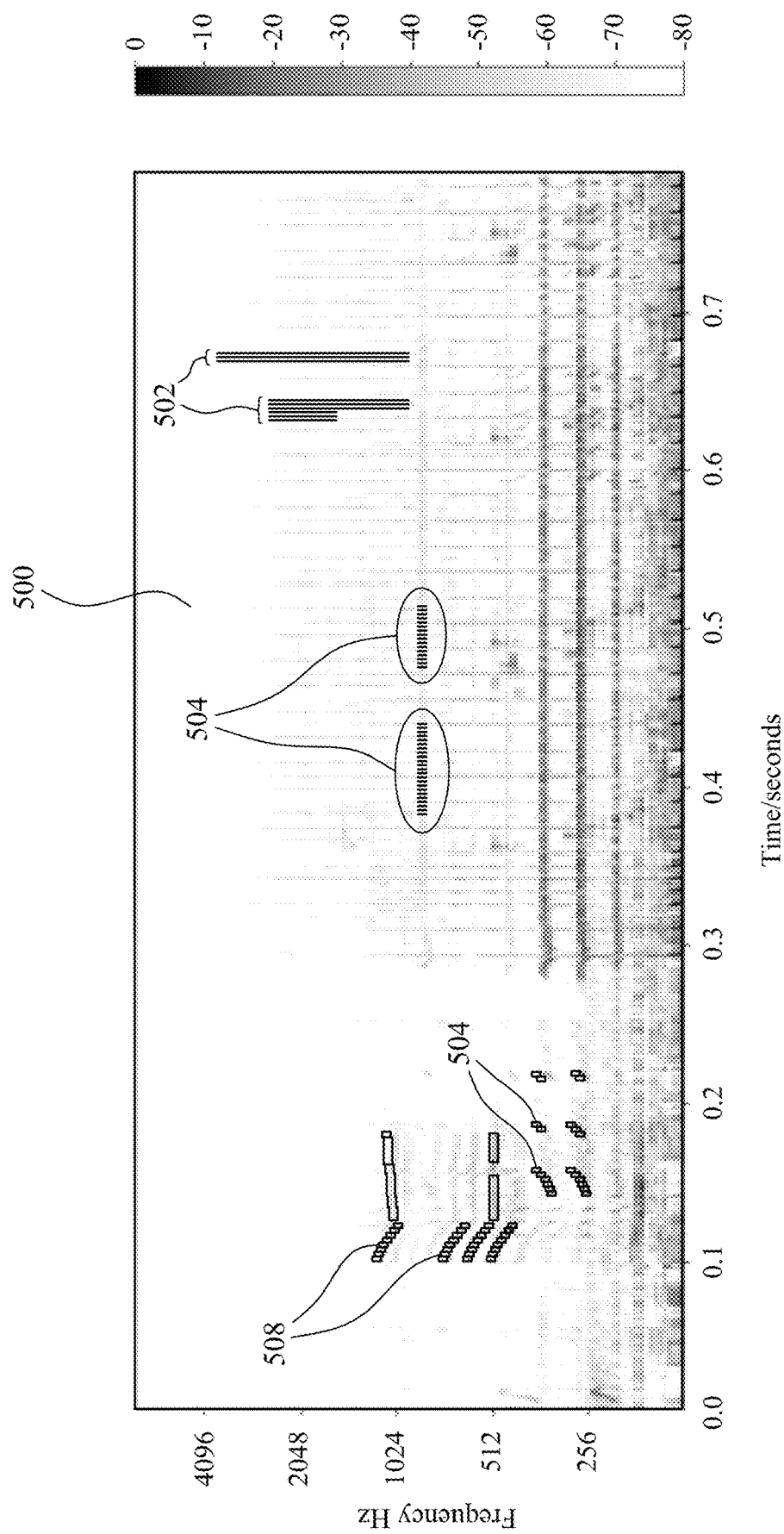
FIG. 4 is a presentation of a typical mel-spectrum for an audio track.

Turning briefly to FIG. 4, a typical mel-spectrum 500 is shown for an audio track. As will be understood, a mel-spectrograph (interchangeably known as or referred to as a mel-spectrum) is a quasi-logarithmic spacing roughly resembling the resolution of the human auditory system and thus a more "biologically inspired" perceptual measure of music. The mel-spectrum is a representation of the short-term power spectrum of a sound across a frequency spectrum, based on a linear cosine transform of a log power spectrum on a nonlinear mel scale of frequency. In the mel-spectrum, consideration of a power spectrum in a frequency bin between (nominally) 50 Hz to 100 Hz would equate to consideration of a power spectrum across a larger frequency range at higher frequency, e.g. 400 Hz to 800 Hz but also 10 kHz to 20 kHz. The process of how a mel-spectrum is generated is well-known, because these frequency bins are perceptually of equal importance in musical interpretational terms.

Moreover, whilst noting that audio tracks can have musical themes that change on a section-by-section basis and which could thus affect the mel-spectrum, for the sake of explanation of a preferred embodiment it is assumed that the theme in the audio—and therefore the excerpted window—is relatively constant. Of course, the alternative is to partition an audio track, such as "Bohemian Rhapsody" by QUEEN™, into sections that are each subject to a discrete evaluation process in semantic space.

Not only is the mel-spectrum just a partial sample, but it is also complex in nature in that it has dimensions in both the time domain and the frequency domain. Within the resulting 2-dimensional matrix of time domain and frequency domain components, a theme can be identified by isolation of patterns of interest. Such patterns of interest can be observed within the spectral components of a plot of frequency (ordinate) against time (as abscissa): i) parallel vertical lines 502 stretching across the mid and high frequency range; ii) interrupted horizontal lines 504 in the high-mid frequency range; iii) ascending 506 or descending 508 steps in the low-mid frequency range. Other patterns, as will be understood, also exist with the mel spectrum with these discoverable The property texture can therefore be derived from analysis of the mel-spectrum and, particularly, identification of patterns and trends by an ANN that provides additional vectorial components in property space that are used in the training of the system 300 of FIG. 2.

An output from each ANN, including a contribution for texture, for each track used in the training sequence/training data set is then assembled as an output, in property space, into a multi-dimensional output vector concatenated or otherwise assembled from multiple outputs $OR_x$, $OTO_x$, $OTI_x$ and $OTX_x$ (where x represents the related track number, i.e. track 1 or track 2) for each property for each track. The precise length of each output vector is open to a degree of design freedom, noting that its length is selected to be sufficient to allow for objective evaluation and differentiation in property space. In a preferred embodiment, each essentially parallel-processed output from each ANN chain contributes a sixty-four dimensional output vector $OR_x$, $OTO_x$, $OTI_x$ and $OTX_x$ for each of the properties of rhythm, tonality, timbre and texture (the latter of which requires a different processing as will be explained below).

Referring again to FIG. 2, a mel-spectrum 500 is generated for each one of the selected pairs of files (in this exemplary case digital audio tracks) 302, 304. This process is well understood by the skilled addressee. Both tracks are firstly subjected to processing within a convolutional neural network "CNN" 320, with individual vector outputs for each track then subjected to processing and interpretation with an assigned ANN ($NN_{Tx}$ 316) for texture evaluation. $NN_{Tx}$ 316 is therefore in a parallel with the other neural networks responsible for evaluation and embedding of vectors for rhythm, tonality and timbre. Respective vector outputs $OTX_1$, $OTX_2$ for tracks 1 and 2 from $NN_{Tx}$ 316 are, in a preferred form, also sixty-four dimensional vectors, with each of these outputs then concatenated or otherwise assembled with the three other vectors for each track (labelled $OR_x$, $OTO_x$, $OTI_x$) to produce a two-hundred and fifty-six dimensional vector for each of tracks 1 and 2. This two-hundred and fifty-six dimensional vector—again the precise length is a design option as indicated above—is the aforementioned "second vector in Euclidean space".

System intelligence includes a comparator 330 that functions to evaluate distance measures in property space (arising between the assembled composite second vectors for each of the paired tracks as assembled from the four outputs $OR_x$, $OTO_x$, $OTI_x$ and $OTX_x$) with corresponding distance measures in semantic space. The system intelligence thus establishes an association between the two spaces. As an example of how the system operates to compare distances between vectors, the system intelligence may utilise a squared-absolute distance calculation.

The system intelligence then functions to contrast the first vector and second vectors with an operative view to have the second vector aligned with the closeness assessment of the first vector. In other words, the system intelligence contrasts the semantic distance (based on textual evaluation) with a property distance. Putting this differently, the first vector in semantic space (based on the human descriptions of source files) is used to assess and correct the second vector (associated with extracted measurable properties of the content) in property space, thereby allowing convergence—through changing of weights in the ANN—of the output of the secondary neural network to the semantic result of the first neural network. The objective is that the re-combined concatenated output [and, particularly, the evaluated Euclidean property vector relating to differences 330 between training tracks] is also represented on a scale of zero to one, and neural network weights in each of the ANNs for rhythm "$NN_R$" 310, tonality $NN_{TO}$ 312, timbre $NN_{TT}$ 314 and musical texture $NN_{TX}$ 318) are adjusted so that the Euclidean property distance measure 330 tends to, i.e. preferably replicates, the semantic quantized distance. Other scaling may be applied rather than hard levels in a quantization approach.

Particularly, the weight factors applied in each of the ANNs for rhythm "$NN_R$" 310, tonality $NN_{TO}$ 312, timbre $NN_{TT}$ 314 and musical texture $NN_{TX}$ 318 are adjusted by an understood process of backpropagation so that the result of the Euclidean property distance measure 330 between comparative pairwise tracks/files tends towards—and ideally eventually correlates with a high degree of accuracy to—the distance measures in semantic space. As will be understood, the process of backpropagation therefore trains each neural network by adjusting applied weights based on contrasting objectively measurable signal attributes used to define identifiable file properties.

The effect of evaluating two independent paths—the first processed entirely in semantic space and the second pushed into measured property space based on measurable qualities of subjectively-assessed properties—produces an emotionally-perceptive system that more closely aligns with human perception of either closeness or dissimilarity. The effect, in the exemplary context of finding tracks between different genres of music, is that quantitatively more as well as qualitatively better associations are made between different tracks even when those tracks may, upon initial inspection, objectively appear to be in radically distinct and unrelated music genres. This represent a step-forward in addressing problems such as cold start in a providing an improved and reliable recommendation tool that can push relevant content to new or existing users. In fact, the process and system's architecture are emotionally perceptive to the extent that it permits language independent embedding of semantic meaning. This means that, for example, Chinese and English may be overlaid without affecting semantic interpretation or the results.

As a further component to the assessment of semantic properties of an audio work in objective Euclidean space, a mel-spectrograph is processed through a convolutional neural network "CNN" to produce a vector component representative of a subjective but complementary concept of musical "texture".

Figure 5:
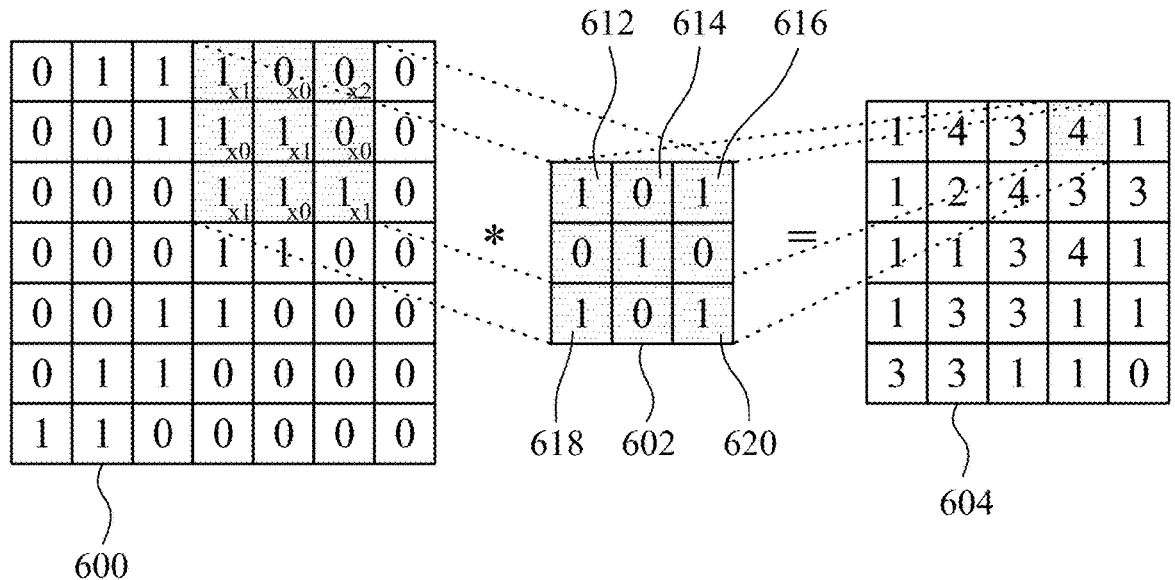
FIG. 5 is illustrative of convolutional and pooling layers within an artificial neural network assigned to mel-spectrum interpretation.
Figure 5:
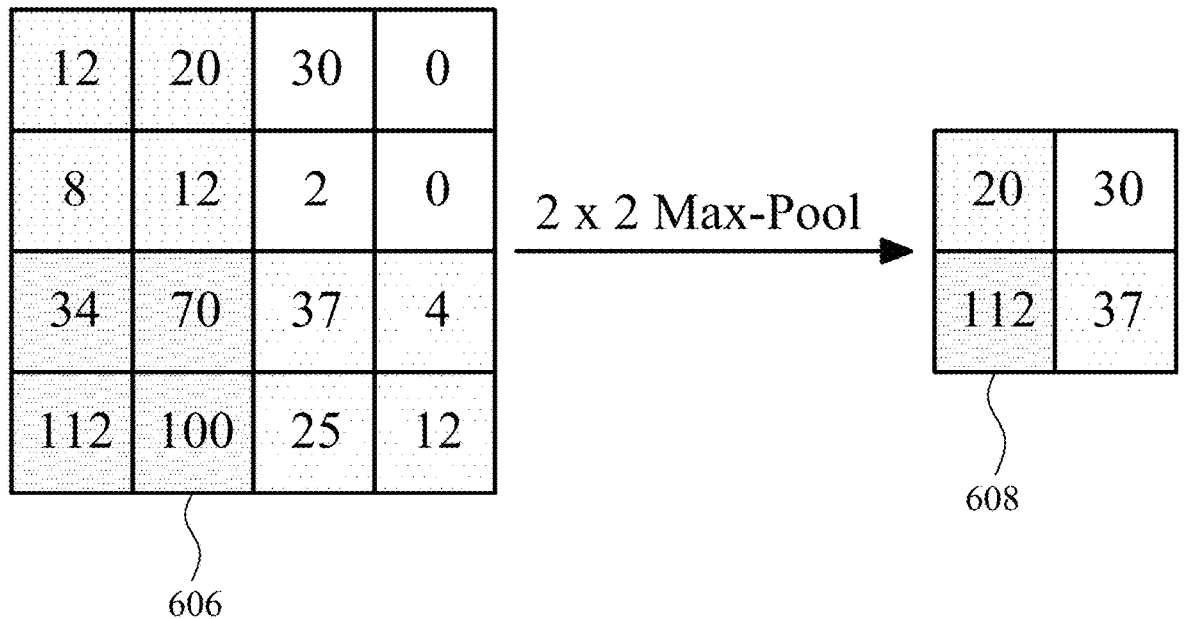

FIG. 5 is illustrative of convolutional and pooling layers within an artificial neural network assigned to mel-spectrum interpretation and, particularly, the deep learning needed to identify important musical patterns and trends in the tracks under assessment. Convolutional processing addresses the two-dimensional nature of the spectral input matrix 600.

As indicated, the mel-spectrum includes time-varying patters that reflect texture that serves as a further component for similarity/dissimilarity assessment of properties in property space. In order to identify these textural trends in a 2-dimensional mel-spectrogram, filters in the convolutional neural network are trained to identify patterns with the mel-spectrogram and, particularly, to identify optimized parameter values within each of these filters that generate filter outputs that reflect a high degree of confidence in the identification of patterns/trends in the input matrix. As such, parameters within each filter will be adjusted, as will be understood by the nature of operation of ANNs, to permit each filter to detect a particular input that is relevant to desirable subjective properties, e.g. rhythmic and/or melodic patterns, contained within the mel-spectrum of the tracks under investigation.

In this regard, the chain of processing in the ANN for texture includes sequential convolutional layers. For example, layers 1, 3 and 5 may be implemented as convolutional layers respectively with 128, 128 and 64 neurons and with each filter having a kernel size [i.e. the size of the filter matrix] of three (3). During training, on a stepwise basis across the spectral input matrix 600, a filter 602 [having an initially untrained and then a revised set of parameters] is advanced. By applying the filter 602 to input data, an output matrix 604 yields positive match results between input values in the overlaid matrix. For example, as a simplistic example:

Sample of 2-D Matrix Filter #1 Yield (match) (position n)

In an iterative stage, the values of the parameters in the filter are then altered and a the 2D input re-run to determine whether the new filter coefficients yield a better or inferior result for matches for the same input data, e.g.

Sample of 2-D Matrix Filter #2 Yield (match) (position n)

In progressing through all possible filter positions in the 2D input data, a further results matrix 604 of positive yield results is developed; this is representative of the ANN trying to optimise filter coefficients/parameters to maximize matches. In FIG. 5, the results matrix of identifies that higher correlation with the filter 602—and therefore a high match and higher likelihood of identification of an interesting pattern in the input data—is experienced with values of four (4) relative to poorer matches indicated by zeros and ones.

As with any CNN, with more filters one can identify more patterns, but this comes at the expense of requiring more parameters and a need for more training data.

Preferably, for reasons of expediency, each convolution is followed by a max pooling layer having a suitable kernel size, such as a 2×2 matrix/kernel. The effect of the max-pooling approach is shown in the lower part of FIG. 5 in which a results matrix 606 is decimated to generate a new smaller input matrix to be processed in the successive convolutional phase. As will be understood, max pooling looks at a block of outputs and then rejects all but the highest value in the analysed block on the presumption that lower values are statistically not relevant in subsequent processing. In FIG. 5, applying a 2×2 max pooling approach to a 4×4 input matrix from the preceding convolution stage yields four independent blocks, with each of those blocks containing four (yield) values. The max pooling result is then a first 2×2 max-pooled matrix 608 in which only the highest yield values are retained. This first 2×2 max-pooled matrix 608 is then input as into a successive convolutional layer. Consequently, max pooling reduces the operative size of the matrix to reduce dimensionality over different (successive) layers of the ANN.

The use of the max-pooling approach increases computational efficiency since, with each neuron introducing a parameter that requires learning, restriction of the input matrix size reduces the amount of data (that otherwise is required to mitigate inappropriate granularity and inaccuracy in calculating parameters/weights).

The CNN therefore includes several convolutional layers typically interspersed by a max-pooling layer.

An output of the last max-pooled layer is flattened, i.e. all matrix columns are concatenated to form a single vector which acts as the input to the dedicated neural network for texture assessment, i.e. musical texture $NN_{TX}$ 318.

Figure 6:
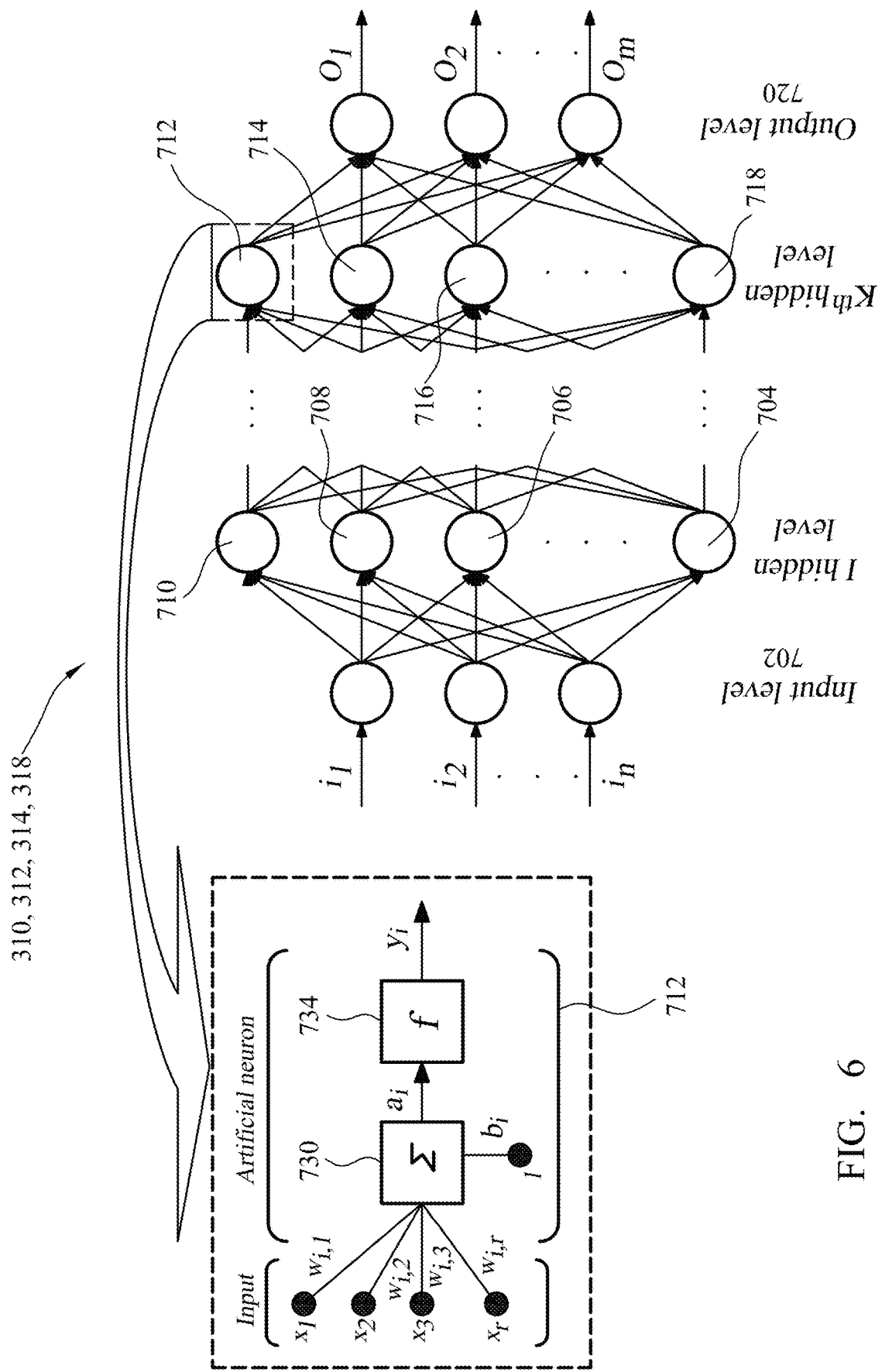
FIG. 6 is a representation of an artificial neural network employed within the various ANN chains of FIG. 2.

Before discussing the general form and operation of the ANNs shown especially in the context of FIG. 6, it is noted that the flattened output from the CNN 230 is applied as (for example) a sixty-four dimensional vector the input to a two-hundred and fifty-six neuron hidden layer of the dedicated texture neural network $NN_{TX}$ 318 preferably with a rectified linear unit ("ReLU") activation function for optimized deep learning. The texture neural network $NN_{TX}$ 318 provides, at its output, a sixty-four-dimensional vector (in the form of an activated linear function) representing each of the mel-spectral component $OTX_1$ $OTX_2$, with these vector $OTX_1$ $OTX_2$ assembled with the other output vectors representing each of file's evaluated properties, i.e. tonality, timbre and rhythm. The resulting 256-dimensional vectors for each of the two pairwise files are then made the subject of the distance evaluation in Euclidean space, as indicated above and represented in FIG. 2.

The initial/upper convolution layers of the CNN function to identify filter weighting to be applied to across neural nodes in order to define useable parametric functions that allow identification of these patterns of interest in the mel-spectrum [that is the input in the CNN]. Values for the parameters 612-620 of the filter matrix are thus learnt by iteration and backpropagation that tests the viability of alternative values to optimize an output, with optimization developed during successive passes across the source input data and varying source inputs of the training set.

FIG. 6 is a representation of an artificial neural network 700 employed within the various ANN property-processing chains of FIG. 2.

Each of the ANNs for rhythm "$NN_R$" 310, tonality $NN_{TO}$ 312, timbre $NN_{TI}$ 314 and musical texture (post convolutional processing) $NN_{TX}$ 318 includes a multi-neuron input layer or level 702 followed by at least one and usually a plurality ($1^{st}$ to $k^{th}$) of hidden neuron layers that contain at least the same number of individual neurons 704-718 as the multi-neuron input layer or level 702. The $k^{th}$ hidden layer provides an output level 720, with the number of neurons in the output generally less than the number of neurons in the preceding $k^{th}$ hidden level.

In terms of basic neuron mapping, an output from each neural (such as in the first input layer) is mapped on a many-to-many basis as inputs into each neural in the immediately following (e.g. $1^{st}$ hidden) layer. The $k^{th}$ hidden layer, i.e. the penultimate later of each ANN, maps multiple inputs to each of its outputs ($O_1$ to $O_m$) on a many-to-one basis such that the output $O_1$ to $O_m$ is a linear function (such as described at https://towardsdatascience.com/activation-functions-neural-networks-1cbd9f8d91d6).

Each quantized signal representation extracted for each identified property (in the case or rhythm, tonality and timbre) or the flattened output from the CNN function (for texture) is provided as an input (ii to in) to one of the neurons of the input layer 702.

Taking neuron 712 as an example, it can be seen in FIG. 6 (left side, boxed representation) that the neuron receives a plurality of weighted inputs $w_{i,1}$, $w_{i,2}$, $w_{i,3}$, $w_{i,r}$ that are summed together in a summing function 730. The summing function, in fact, includes a secondary bias input $b_i$ which is generally just a learned constant for each neuron in each layer. It is the weights $w_i$ and the bias $b_i$ that the processing intelligence estimates and then revises though a backpropagation process that takes the pairwise Euclidean property distance measure 330 as the influencing factor and, particularly, how this assimilates/maps to the corresponding pairwise target distance in semantic space. An output $a_i$ from the summing function 730 is subjected to a non-linear activation function f (reference number 734). The output of the neuron $y_i$ is propagated to the next layer.

In the exemplary sense of pairwise audio data signal comparison, the input $i_i$ to $i_n$ may be derived from the Essentia feature set as identified above in relation to timbre, tonality, rhythm, whilst the CNN mel spectrum provides the neuron input for the texture-dedicated artificial neural network $NN_{TX}$. The final outputs $o_1$ to $o_m$ form the 64-dimensional embedding vector for each particular property, e.g. timbre $OTI_1$ and texture $OTX_2$.

With respect to a preferred implementation for FIG. 6, there are at least two hidden layers. The first hidden layer contains five hundred and twelve (512) neurons. The second hidden layer contains one thousand and twenty-four (1024) neurons. The activation function in both of these hidden layers is, preferably, the ReLU function, such as described at https://en.wikipedia.org/wiki/Rectifier (neural networks).

Referring in detail now to FIG. 3, the training process by which the system of FIG. 2 is trained is set out in general terms.

From a universal training set of audio tracks (or a selected subset of pairs), a pair of tracks for semantic and musical property comparison is selected 402. Both tracks are then subjected to feature extraction 404 to identify properties, e.g. multiple sets of measurable descriptors that can be used to define rhythm, etc. Texture, as indicated above, follows a modified process given the nature of the mel spectrum. For each pair, the properties are commonly processed by the system intelligence to train the network and refine the weights and bias values applied 406 in each of the parallel artificial neural networks for rhythm "$NN_R$" 310, tonality $NN_{TO}$ 312, timbre $NN_{TI}$ 314 and musical texture $NN_{TX}$ 318. Regardless of whether ANN processing involved a CNN or not, each of the multiple parallel neural networks operate to contribute 408 an embedded vectorial output 350, 352 [assembled from contributing vectors $OR_x$, $OTO_x$, $OTI_x$ and $OTX_x$] in (typically Euclidean) property space for each of the pair of files under consideration. An assessment/determination 410 of a Euclidean property distance between the vectorial outputs 350, 352 for each of the files is then undertaken. The determined Euclidean distance, calculated by the neural networks, is then mapped/contrasted with the semantic distance (in semantic space) between the same files (as described in relation to FIG. 1).

If it is assessed 418 that there is general numerical correspondence 416 between the property distance and the quantized semantic distance—which is unlikely for initial weights and bias values at the outset of training with the first few tens/hundreds of pairwise comparisons—then a determination may be made as to whether the weights and biases in the contributing ANNs satisfy an agreeable rule. This may permit the cutting short of ANN training without exhausting all pairwise comparative options, although optimization in each NN will be improved with an ever-increasing number of pairwise assessments and weight and bias revisions.

From a practical perspective, the system is typically arranged to undertake several runs or "epochs" through the entire training set. Training can be halted when (a) the training loss does not improve over several epochs, or (b) the validation loss (on unseen data) does not improve. It is noted, also, that if the training loss improves but the validation loss does not, the this is indicative of overfitting.

At the outset of training, however, there will likely be significant differences and a requirement for refinement of ANN operation in terms of parameter identification using refined filter weights $w_i$ and bias $b_i$ values. This is achieved through use of the entire universe of training data to optimise ANN performance. Consequently, the training process replicates the path of pairwise assessment for all members in the training set. This is represented by decision block 414 and negative or affirmative paths therefrom.

If there is repeated close correspondence (affirmative path between the quantized semantic distance and the (typically-used) property distance obtained from the vectorial outputs 350, 352) for file after file, then optimization of the weights and biases may be assumed to have been achieved (at least to an appreciable and acceptable extent).

Returning to the path (i.e. negative outcome 420) between where significant numeric discrepancies exist between the distance measures in semantic and property spaces, then filter parameters and, particularly, applied weights and bias in one or more of the neural networks need to be adjusted. The objective in this adjustment is to realise a numerical convergence between vectoral distance dissimilarity measures in property space to associated, i.e. corresponding, distance dissimilarity measures in semantic space. It is noted that, in this respect, the values in property space will invariably vary from the hard values of zero and one in semantic distance space because perceptual differences and absolute differences exist between dissimilar pairs of tracks (even if the compared tracks are cover versions of the same song). Checking for loss or overfitting after each epoch is a typical approach.

The processing intelligence in the system therefore adjusts 422 weights and biases through backpropagation to seek convergence between semantic and property (numerically-based) distances. These adjusted weights are then applied to the neurons in the various neural networks, as shown in FIG. 2, in order to improve the alignment for a next pair of files in the training set.

The training of the ANNs yields distance values in property distance space that reflect track dissimilarities on a pairwise comparative basis. Consequently, once trained, any distance in property distance space maps accurately and reliably to actual perceivable differences in semantic space. The changing of weights and biases in the neurons of the ANNs is the transformative function or mechanism by which the property space is mapped into abstract semantic space.

Once the training set has been exhausted, the neural networks are assessed to have been optimised. This is reflected by the affirmative path 424 from decision block 414.

As will be understood, each processing chain for each extracted property is a machine. In the present exemplary case of audio evaluation, there are four machines: one each for rhythm, tonality, timbre and texture. In order to optimise the training process, it has been appreciated that the independent machines each make an independent, de-coupled contribution to the final vectorial representation 350, 352 in property space. Consequently, a preferred approach, on a pairwise assessment basis relative to the semantic evaluation in semantic space, is to adopt a weighting of importance between each of these effectively parallel individual machines. In other words, the training process determines a relative importance between particular audio descriptors (associated with each property) within each input to the respective ANN. This means that each machine learns which of the specific contributing extracted measurable values has the greatest impact in altering a final result that reflects the desired human subjective assessment (in semantic space). To achieve this, the system operates to assess two tracks into each machine. Each machine is then configured to identify similarities or dissimilarities between the set of quantized representations used to define each property being evaluated by the specific machine. The machine, in adjusting its biases and weighting factors in the backpropagation process, operates to downplay, i.e. reduce the relative significance of, the property (e.g. rhythm) if there's dissimilarity (in property distance space) with the corresponding property being, in a preferred embodiment, simultaneously evaluated in the specific pairwise comparison in semantic space. In other words, identified dissimilarity does not contribute to generating a set of biases and weights that brings about better alignment with the semantic assessment and semantic differences between evaluated pairwise audio tracks in semantic space. As such, across each machine, the system intelligence weights implicitly the other properties (in both tracks) in particular machines since these other properties are assessed to have a greater impact on aligning with the semantic assessment, i.e. rhythm vectorial components $OR_x$ may be assessed by the system to have a greater contribution to human perception of the qualities of the audio content relative to the tonality vectorial components $OTO_x$. Indeed, extending this principle to individual quantization representations, machine-identified dissimilarity between individual quantized representations (such as barkbands_crest values that contribute in Essentia to the property timbre) in comparative pairwise tracks means that such individual quantized representations are of less significance in aligning property-based vectors to the semantically-based values.

It will be appreciated that the accuracy of a resulting transformative function of the neural network is dictated by the robustness of the training data and particularly the size of the matrix so whilst ten thousand audio files might be assessed to generate correspondingly ten thousand vectors, it is perceived that significantly fewer or significantly more can be critiqued by NLP to provide the embedding.

To build a comparative library, it is now necessary for each of the files in the training set to simply be processed 426, on a non-comparative basis, through the ANNs to generate a Euclidean vector for that track. This vector can then be stored 430 in a database as value cross-referenced to a file name, e.g. a song title and artist or other form of identifier. Since the vector is comprised from distinct components attributable to particular file properties, the vector can itself be parsed to permit searching for a particular identified property. For example, if commonality in rhythm is an over-riding requirement, then any numerical closeness between source and reference files in this particular contributing (in the preferred but exemplary case) sixty-four-dimensional output $OR_x$ is deterministic of semantic closeness in rhythm.

In other words, when the individual artificial neural networks for rhythm "$NN_R$" 310, tonality $NN_{TO}$ 312, timbre $NN_{TT}$ 314 and musical texture $NN_{TX}$ 318 have been optimised, the measurable properties of an (exemplary) audio track are reliable reflected in a multi-dimensional vector generated by processing a sample (e.g. partial or entire song) of the audio track through the various NN having set optimised weights and biases. Consequently, based on an absolute value scale, actual perceivable dissimilarities or similarities can be assessed for track against track, including new tracks that were not used in the training data set. At this point, the semantic distances used for training can therefore be ignored because semantic space has now been mapped to an absolute scale where close numeric values accurately represent contextual similarity, whereas large numeric distance represent user-discernible dissimilarity.

Figure 7:
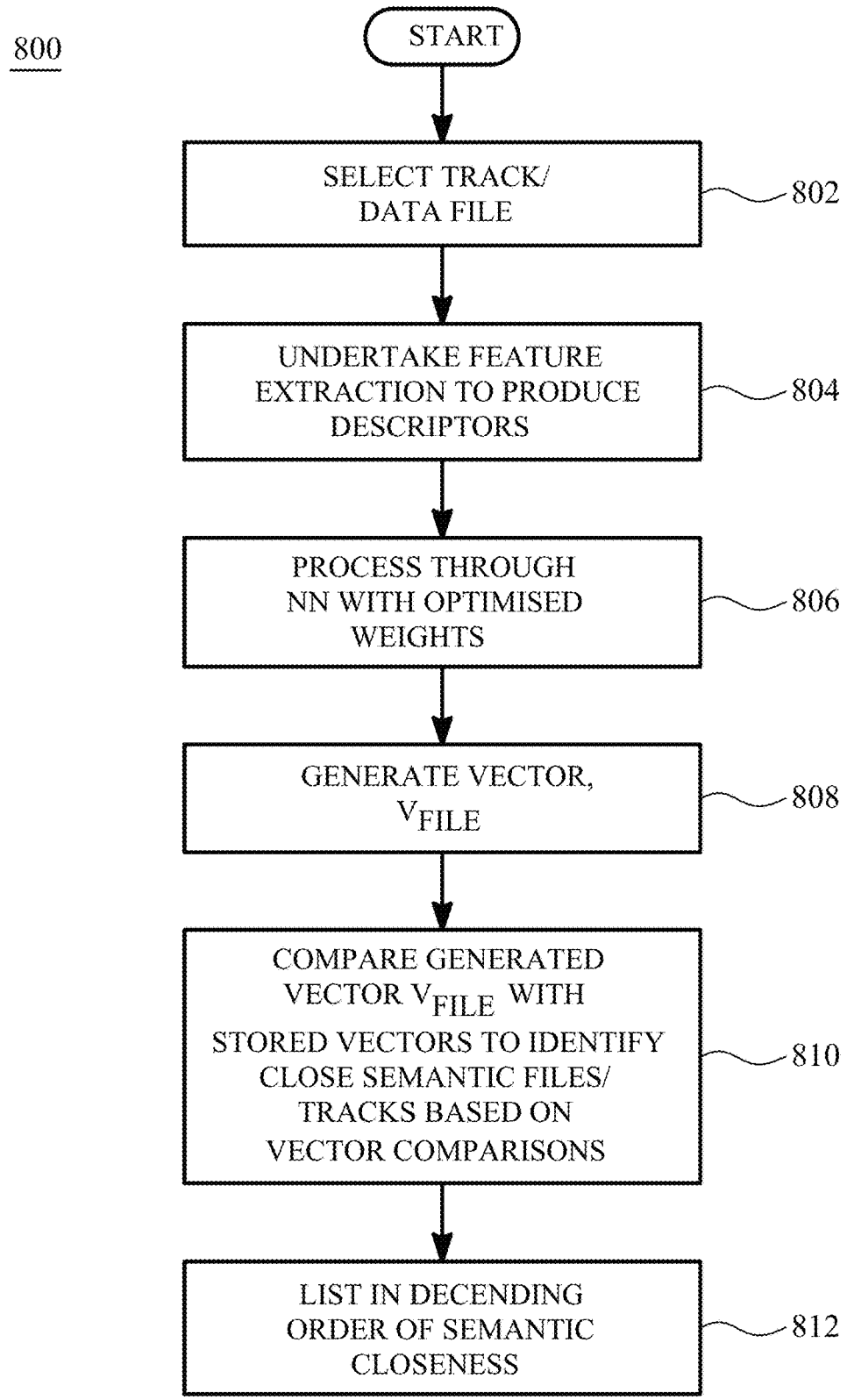
FIG. 7 is a flow process employed by a preferred embodiment to assess a measure of emotionally-perceptive file dissimilarity, especially in the context of an audio file.

FIG. 7 is a flow process 800 employed by a preferred embodiment to assess a measure of emotionally-perceptive file dissimilarity, especially in the context of an audio file.

Once the neural network of FIG. 2 has been trained, an audio track (or the appropriate category of file) is selected 802. The selection is typically by a user, such as an owner of or subscriber to a music library or service. Alternatively, selection may be in the form of an upload of a piece of music or file, including an original composition. The selected or uploaded "first" audio file is then processed to obtain feature extraction 804 of identifiable properties, such as tonality, etc. The neural network of FIG. 2 then processes 806 the extracted features using the optimised weights and biases to generate 808 a first file vector VFILE (in Euclidean property space or some other appropriate property space) representative of a plurality of user-discernible or user-selectable, system measurable properties of that particular file. Referencing 810 the file vector VFILE for the first audio file into a library that is indexed by both file identifiers and associated file vectors (for those other files) permits those library-based files to be listed 812 in a descending order of semantic similarity to the first audio file. This can be achieved with or supplemented by the use of kNN analysis.

Figure 8:
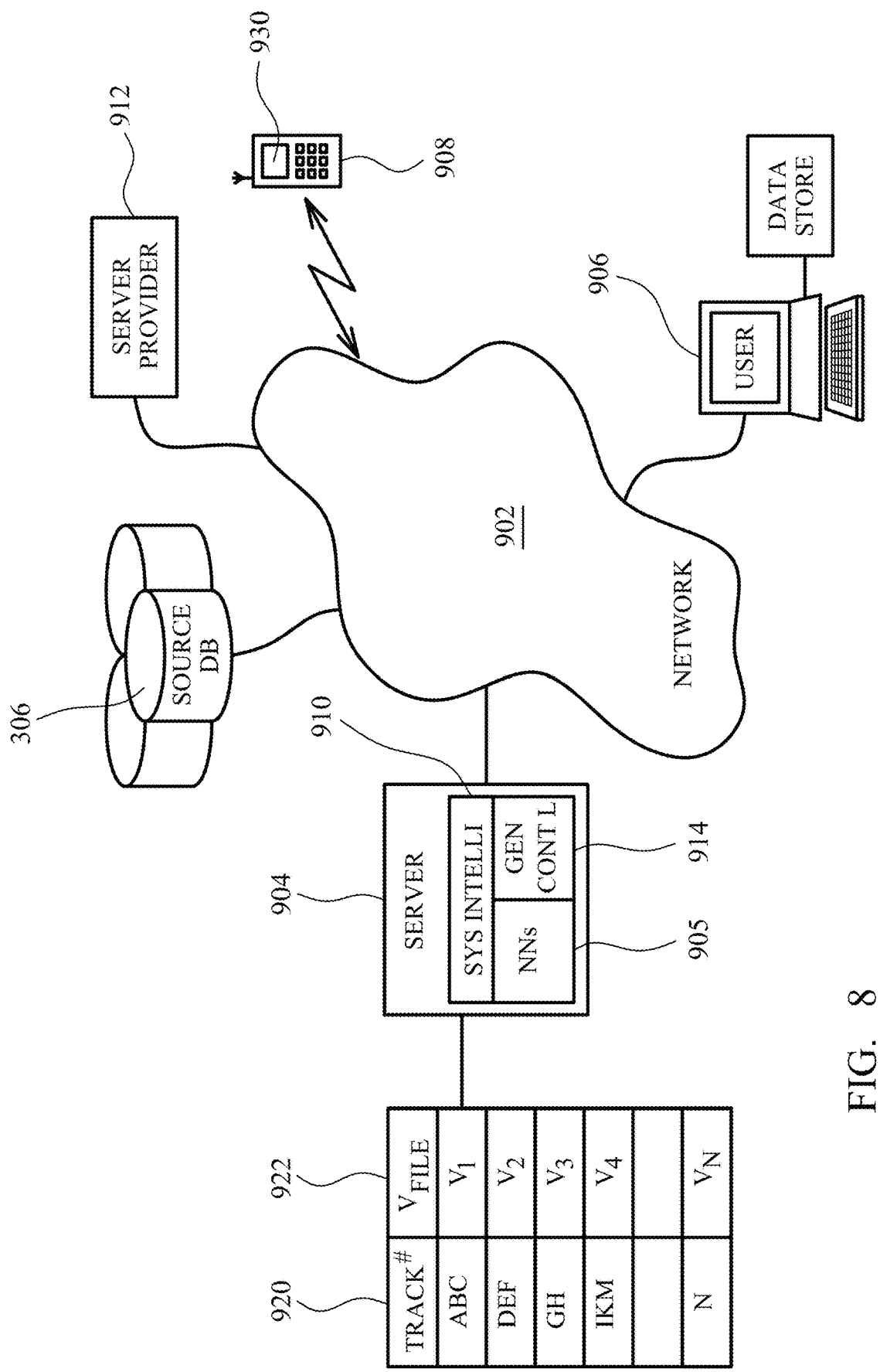
FIG. 8 is a network architecture, including an accessible database containing vector representation according to a preferred embodiment.

FIG. 8 is a system or network architecture 900, including an accessible database 902 containing vector representations reflecting file similarity/dissimilarity measures according to aspects of the present invention.

Typically, a network (such as the internet) 902 permits communications to be passed between devices, such as a server 904, a home computer 906 and a smartphone 908. These three categories of device are not limiting but indicative of both processing intelligence within, and access points of/into, the system 900. The server 904 typically supports the artificial neural network 905 described above especially in relation to FIGS. 2 and 6. The system intelligence may, however, be more distributed, including being cloud-based or distributed between a plurality of interconnected servers. For the sake of clarity only, system intelligence is simply shown as a block within the server, although it will be readily appreciated that computing power is also within the smartphone and computer. The server, as with other interacting units, will include general control firmware and software 914, e.g. to support web-based access and/or to control registration of user's to services administered by the server or other service provider 912 and/or to support communications protocols. The server may regulate access and information loaded into or extracted from a source database 306 coupled to the server, e.g. via a LAN or WAN. This access may be by the computer 906, smartphone 908 or the like.

The source database may, in fact, be an existing library of files, such as a catalogue of audio files. Files in the source database may, therefore, over time be extracted by the server and processed to produce cross-referencing between files identities (such as track name and artist) 920 and generated Euclidean vector measures (WILE) 922 representative of file properties aligned with emotionally-perceived semantic qualities.

The provision of a user interface 930, such as a touch-screen of a graphic user interface "GUI" on, for example, a smartphone provides access to searching tool software application that permits searching for tracks sharing close semantic properties according to the invention. The software may be local or otherwise accessed through a web browser allowing interaction with the server 904, databases 306 or service providers (such as social media companies having access to content). Alternatively, the software may be hosted as a web-based service. Preferably, the GUI 930 offers the user with a number of "soft" slider controls that relate to selectable properties or listening/searching preferences, e.g. a first slider may relate rhythm. The slider positions can therefore be altered, by the user, to reflect search parameters that correlate to individual contributing multi-dimensional vectors $OR_x$, $OTO_x$, $OTI_x$ and $OTX_x$ in the final embedded vectorial output 350, 352. Setting the sliders on the GUI therefore targets specific vectorial aspects in processed tracks 920 stored within the system.

Unless specific arrangements are mutually exclusive with one another, the various embodiments described herein can be combined to enhance system functionality and/or to produce complementary functions or system that support the effective identification of user-perceivable similarities and dissimilarities. Such combinations will be readily appreciated by the skilled addressee given the totality of the foregoing description. Likewise, aspects of the preferred embodiments may be implemented in standalone arrangements where more limited functional arrangements are appropriate. Indeed, it will be understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions. In terms of the suggested process flows of the accompanying drawings, it may be that these can be varied in terms of the precise points of execution for steps within the process so long as the overall effect or re-ordering achieves the same objective end results or important intermediate results that allow advancement to the next logical step. The flow processes are therefore logical in nature rather than absolute.

Aspects of the present invention may be provided in a downloadable form or otherwise on a computer readable medium, such as a CD ROM, that contains program code that, when instantiated, executes the link embedding functionality at a web-server or the like.

It will, of course, be appreciated that the above description has been given by way of example only and that modifications in detail may be made within the scope of the present invention. For example, the principle by which the neural network is trained and how semantically-assessed qualities, indicated by scaled distances, in a sematic vector space can be mapped to an objectively-generated (typically Euclidean) vector in property space can be applied to multiple forms of searchable data, including audio, visual and/or film, literature and scientific reports (such as medical reports requiring cross-referencing for trend analysis).

Properties that may be extracted for such different source data include brightness, contrast, colour, intensity and shape and relative size as well as relative feature position and rate of change in some or all of these properties. Other measurable properties exist for such files, including word-frequency (for text analysis) or motion-related measurements (derived from sensors), so the above is provided as a non-limiting example of how a property space can be populated with meaningful vectors [in property space] that can be contrasted with and aligned to those presented in semantic space. For an image or video, the entirety of the pixelated image or a succession of frames could be used to correspond to musical "texture", with all pixels in the sampled image providing a two-dimensional matrix for convolutional processing. Indeed, it will be appreciated that there is a degree of overlap between the properties derivable from static images or video and music modality, as described in detail but exemplary embodiments above.

The following clauses further reflect or emphasise aspects of the present disclosure that may be supplementary to or independent of the invention as claimed but which fall within the totality of the disclosed inventive contribution.

A computer program comprising code that, when executed by processor intelligence, performs the method of any of claims 1 to 24.

II. An artificial neural network "ANN" ($NN_R$ 310, $NN_{TO}$ 312, $NN_{TT}$ 314, $NN_{TX}$ 318) containing layers of interconnected neurons arranged to apply, to content presented to the ANN in the form of at least one of audio content and image content, weights and biases that are selectively configured by backpropagation to correlate quantified semantic dissimilarity measures for said content measured in semantic space with related property separation distances in property space for measurable properties extracted for that content and processed by said neurons of the ANN such that the ANN is configured to value semantic dissimilarity measures over measurable properties in its application of said weights and biases.

III. A system (300) comprising:
  a) a plurality of artificial neural network outputs arranged to provide a plurality of property vectors for a data file and wherein said property vectors are extracted measurable signal qualities from content of the data file;
  b) at least one convolution neural network arranged to provide a further vector that is assembled with the plurality of property vectors to generate a multi-dimensional property vector (350, 352);
  c) processing intelligence arranged to receive first and second different multi-dimensional property vectors for a pair of data files including the first data file and a different data file and, in response thereto, to produce a distance measure between the first and second different multi-dimensional property vectors; and
  d) processing intelligence configured to resolve whether the distance measure in property space correlates to a reference distance generated for the first and second vectors in semantic space, the reference distance based on semantic dissimilarity measurements for reference comparative descriptive content for the pair of data files.

IV. The system of clause III, wherein the processing intelligence associates quantified semantic dissimilarity measures for said content in semantic space with related property separation distances in property space for measurable properties extracted for that content.

V. A digital audio file (302, 304) embedded with a multi-dimensional property vector (350, 352) comprising a plurality of assembled property vector components ($OR_x$, $OTO_x$, $OTI_x$ and $OTX_x$) each relating to a musical property derived from a plurality of sets of quantized representations ($PR_x$, $PTo_x$, $PTi_x$, $PTx_x$) of signal qualities of the digital audio file.

VI. The digital audio file of clause V, wherein the embedded multi-dimensional vector is a vector correlated to musical properties defined by measurable signal qualities indicative of rhythm, tonality, timbre and musical texture.

VII. The digital audio file of clause V or VI, wherein each of the assembled vector components ($OR_x$, $OTO_x$, $OTI_x$ and $OTX_x$) reflect a measure in vector dissimilarity space for the musical property assessed relative to reference vectors in semantic distance separation space.

VIII. A digital image file (302, 304) embedded with a multi-dimensional property vector (350, 352) comprising a plurality of assembled property vector components ($OR_x$, $OTO_x$, $OTI_x$ and $OTX_x$) each relating to a visual property derived from a plurality of sets of quantized representations ($PR_x$, $PTo_x$, $PTi_x$) of signal qualities of the digital image file.

IX. A database containing a multiplicity of digital audio files of any of clauses V to VII or a multiplicity of digital image file of clause VIII.

X. A digital audio file produced by the process herein described and particularly, but not exclusively, produced according to the method of any of the originally filed method claims.

The invention claimed is:

1. A method of training an artificial neural network (ANN) having a first branch and at least one other different second branch where each branch has a plurality of inputs and a plurality of outputs and each branch is tasked to process a specific derivable property derived from measurable signal qualities of content of a data file containing at least one of audio content, image content and text content, the method comprising:

for a selected pair of different data files, extracting measurable signal qualities from content of each of a first data file and a different data file of said pair;

identifying a plurality of different extracted properties from those measurable signal qualities for each data file, where each different extracted property is represented by a processable vector;

selectively inputting processable vectors for specific derivable properties as input to a corresponding one of said first branch and said at least one other different second branch respectively tasked with processing those different specific derivable properties;

at an output of said first and said at least one other different second branch, generating a corresponding property space vector in property space for the respective specific derivable property of the first data file and the different data file of the selected pair, each property space vector describing a measurable signal quality extracted for respective content of respectively both the first data file and the different second data file;

assembling a first multi-dimensional vector for the first data file and a distinct second multi-dimensional vector for the different data file, wherein each multi-dimensional vector is obtained from assembling respective property space vectors from outputs of said first branch and said at least one other different second branch;

determining a distance measure between the first multi-dimensional vector and the second multi-dimensional vector;

deriving a subjectively-derived semantic vector using natural language processing (NLP) of a text description of content for each of the first data file and the different second data file, wherein each subjectively-derived semantic vector describes content in semantic space respectively for the first data file and also the different second data file and each subjectively-derived semantic vector is generated independently of the property space vectors;

assessing the subjectively-derived semantic vectors against corresponding property space vectors by correlating, in the ANN, quantified semantic dissimilarity measures for the subjectively-derived semantic vectors with related property separation distances for the property space vectors to provide an output that is adapted, over time, to align a result in property space to a result in semantic space;

in response to said determined distance measure, adjusting weights of the ANN by a backpropagation process that takes into account identified discrepancies arising between said determined distance measure in property space and quantified semantic dissimilarity distance measures assessed in semantic space for the first data file relative to the different data file, thereby training the system to value semantic perception reflected in the quantified semantic dissimilarity distance measures over property assessment reflected by the distance measure between the first multi-dimensional vector and the second multi-dimensional vector and such that the ANN maps pairwise similarity/dissimilarity in property space for the first data file and the second data file towards corresponding pairwise semantic similarity/dissimilarity in semantic space for the first data file and the second data file:
- to train the ANN to identify and quantify similarity or dissimilarity in audio content, image content and text content, and
- to output, once trained, a measure of similarity between said content of said first data file relative to content in said second data file.

2. The method of training the artificial neural network according to claim 1, wherein the quantified semantic dissimilarity distance measures assessed in semantic space is based on a vectorial representation of a textual explanation associated with each of the first data and the different data file.

3. The method of training the artificial neural network according to claim 2, wherein the textual explanation is coded into metadata of the respective file.

4. The method of training the artificial neural network according to claim 1, wherein the data files contain audio and the properties are musical properties and the measurable signal qualities define properties relating to rhythm, tonality, timbre and musical texture.

5. The method of training the artificial neural network according to claim 1, wherein assessment of the quantified semantic dissimilarity distance measures includes:
- generating semantic vectors for a multiplicity of N-data files in a training set;
- calculating, for the training set and on a pairwise basis, a separation distance between each semantic vector;
- for each of the files in the training set, identifying the smallest and largest separation distances relative to other files in the training set;
- creating, for each file in the training set, a set of pairs in which a first pair has the smallest separation distance and a second pair has the largest separation distance; and
- assigning a first value representing a measure of semantic similarity to the first pair and assigning a second value representing a measure of semantic dissimilarity to the second pair, wherein the second value is different to the first value.

6. The method of training the artificial neural network according to claim 5, wherein the first pair is the first data file and the different data file.

7. The method of training the artificial neural network according to claim 5, wherein for a subset comprising the m smallest separation distances and the m largest separation distances, assigning the first value to the m smallest and the second value to the m largest, where m is a positive integer less than the multiplicity of data files in the training set.

* * * * *